(12) United States Patent
Nagasaka

(10) Patent No.: US 12,204,719 B2
(45) Date of Patent: Jan. 21, 2025

(54) TOUCH INPUT DEVICE AND DISPLAY DEVICE

(71) Applicant: Sharp Display Technology Corporation, Kameyama (JP)

(72) Inventor: Kohji Nagasaka, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/417,149

(22) Filed: Jan. 19, 2024

(65) Prior Publication Data

US 2024/0288967 A1   Aug. 29, 2024

(30) Foreign Application Priority Data

Feb. 27, 2023 (JP) ................. 2023-028636

(51) Int. Cl.
*G06F 3/041* (2006.01)
*G06F 3/044* (2006.01)

(52) U.S. Cl.
CPC ........ *G06F 3/04166* (2019.05); *G06F 3/0412* (2013.01); *G06F 3/04164* (2019.05); *G06F 3/0446* (2019.05)

(58) Field of Classification Search
None
See application file for complete search history.

(56) References Cited

U.S. PATENT DOCUMENTS

2023/0099369 A1* 3/2023 Vaze ............... G06F 3/0446
345/174
2023/0359305 A1* 11/2023 Vaze ............... G06F 3/0443

FOREIGN PATENT DOCUMENTS

JP        2015-121958 A    7/2015

* cited by examiner

*Primary Examiner* — Stephen T. Reed
(74) *Attorney, Agent, or Firm* — ScienBiziP, P.C.

(57) ABSTRACT

A touch input device includes M drive lines; N sense lines; (M×N) electrostatic capacitances; and a signal processor configured to output a first drive signal and detect a change in a plurality of electrostatic capacitances of the (M×N) electrostatic capacitances. The signal processor outputs the first drive signal to the at least one first drive line and outputs a second drive signal having a phase opposite to the first drive signal to each of at least two second drive lines. The signal processor outputs the first drive signal and the second drive signal so that a first amplitude total, which is obtained by multiplying an amplitude of the first drive signal by the number of first drive lines, is substantially equal to a second amplitude total, which is obtained by multiplying an amplitude of the second drive signal by the number of second drive lines.

16 Claims, 12 Drawing Sheets

TOUCH INPUT DEVICE AND DISPLAY DEVICE

CROSS-REFERENCE TO RELATED APPLICATIONS

This application claims the benefit of priority to Japanese Patent Application Number 2023-028636 filed on Feb. 27, 2023. The entire contents of the above-identified application are hereby incorporated by reference.

BACKGROUND

Technical Field

The disclosure relates to a touch input device and a display device.

In the related art, a capacitive touch input device that detects a touched position in accordance with a change in electrostatic capacitance and a display device including the capacitive touch input device built thereinto are known.

For example, JP 2015-121958 A discloses that, in order to increase detection accuracy in a capacitive touch input device, the input device applies a second drive voltage (hereinafter referred to simply as a second drive voltage having the same phase) having the same phase as a first drive voltage of a shield electrode AS to a selected drive electrode X, applies a second drive voltage (hereinafter referred to simply as a second drive voltage having an opposite phase) having a phase opposite to the first drive voltage to the remaining drive electrodes X, supplies charge from a charge integration circuit 22 to a detection electrode Y so that a voltage between the detection electrode Y and the shield electrode AS becomes constant (hereinafter, this supplied charge will be referred to simply as supplied charge), and generates a detection signal Aout corresponding to an integrated value of the supplied charge.

SUMMARY

In the input device disclosed in JP 2015-121958 A, the second drive voltage having an opposite phase is applied to the remaining drive electrode X so that the amount of supplied charge is made different between a case where an electrostatic capacitance (mutual capacitance) between the drive electrode X and the detection electrode Y to which the second drive voltage having the same phase is applied changes and a case where an electrostatic capacitance (mutual capacitance) between the drive electrode X and the detection electrode Y to which a second drive voltage having an opposite phase is applied changes, thereby making it possible to accurately identify a proximity position. In the latter case, a great change in a voltage obtained by adding the first drive voltage and the second drive voltage occurs in the electrostatic capacitance (mutual capacitance), and the amount of supplied charge increases. Thus, the amount of supplied charge is different from that in the former case. In JP 2015-121958 A, there is a problem that a circuit scale is large because a configuration such as a charge integration circuit is required.

An object of one aspect of the disclosure is to provide a touch input device and a display device which can improve detection accuracy while suppressing an increase in a circuit scale.

In order to solve the above-described problems, a touch input device according to an aspect of the disclosure includes M (M is an integer of 3 or greater) drive lines provided in parallel with each other along a detection surface, N (N is an integer of 2 or greater) sense lines provided in parallel with each other along the detection surface and intersecting the M drive lines, (M×N) electrostatic capacitances formed between the M drive lines and the N sense lines, and a signal processor configured to output a first drive signal to at least one first drive line of the M drive lines and detect a change in a plurality of electrostatic capacitances of the (M×N) electrostatic capacitances between the at least one first drive line and the N sense lines based on sense signals received from the respective N sense lines, the signal processor sequentially changing the first drive line to detect a change in the (M×N) electrostatic capacitances, in which the signal processor outputs the first drive signal to the at least one first drive line and outputs a second drive signal having a phase opposite to a phase of the first drive signal to each of at least two second drive lines other than the first drive line among the M drive lines, and the signal processor outputs the first drive signal and the second drive signal so that a first amplitude total, which is obtained by multiplying an amplitude of the first drive signal by the number of first drive lines, is substantially equal to a second amplitude total, which is obtained by multiplying an amplitude of the second drive signal by the number of second drive lines.

According to an aspect of the disclosure, a touch input device and a display device which can improve detection accuracy while suppressing an increase in a circuit scale can be provided.

BRIEF DESCRIPTION OF DRAWINGS

The disclosure will be described with reference to the accompanying drawings, wherein like numbers reference like elements.

DESCRIPTION OF EMBODIMENTS

First Embodiment

Figure 1:
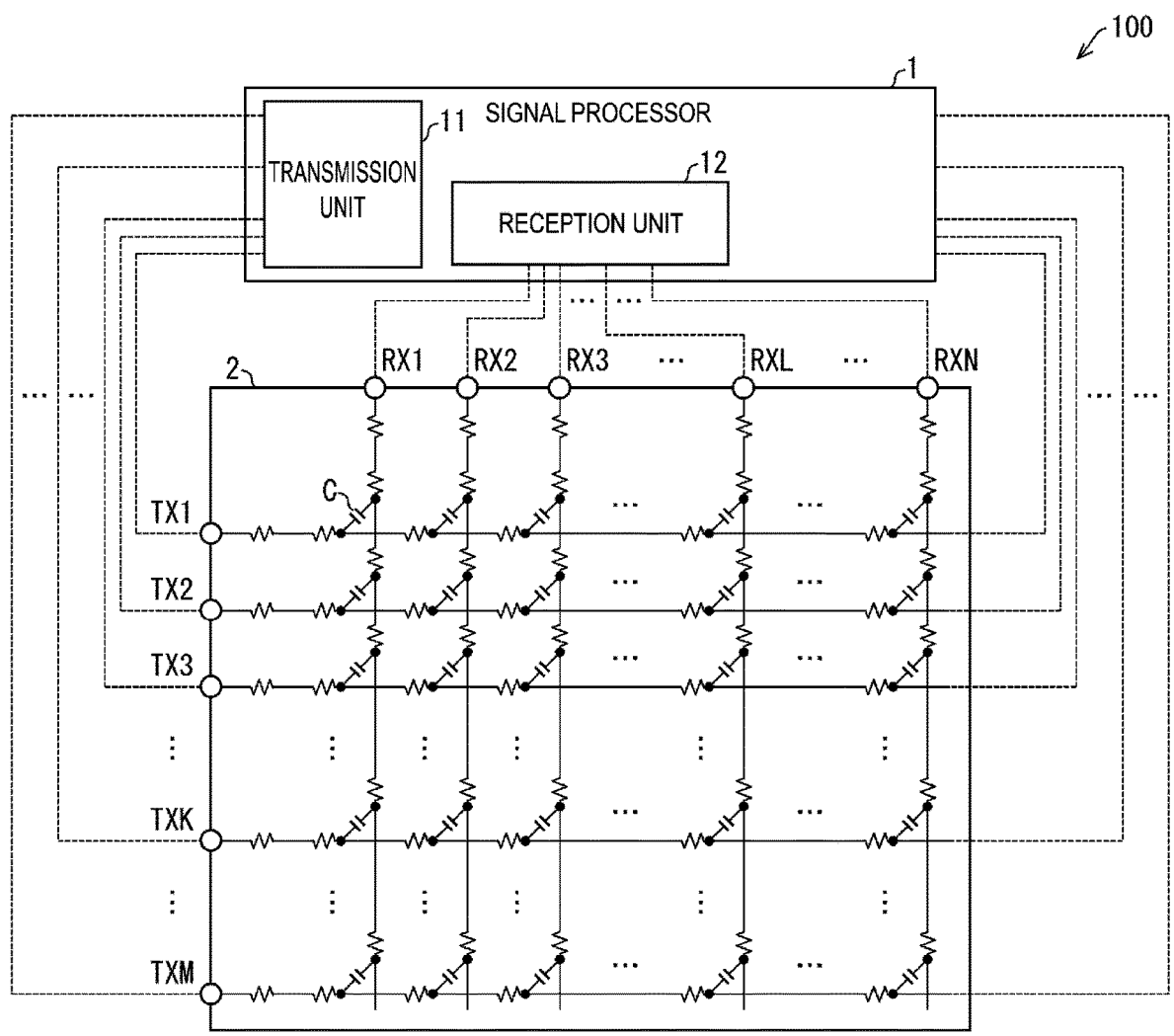
FIG. 1 is a diagram illustrating a schematic configuration of a touch input device according to a first embodiment of the disclosure.

Hereinafter, an embodiment of the disclosure will be described in detail. For convenience of description, the same members are denoted by the same reference numerals, and the names and functions thereof are also the same. Thus, a detailed description thereof is not repeated.

FIG. 1 is a diagram illustrating a configuration example of a touch input device 100 according to a first embodiment of the disclosure. As illustrated in FIG. 1, the touch input device 100 includes a signal processor 1 and a touch sensor unit having a detection surface 2. The signal processor 1 includes a transmission unit 11 and a reception unit 12. Although not illustrated in the drawing, the touch input device 100 may be integrally provided on a surface of a display device such as a liquid crystal panel.

The touch sensor unit includes a detection surface 2, M (M is an integer of 3 or greater) drive lines TX1 to TXM provided in parallel with each other along the detection surface 2, N (N is an integer of 2 or greater) sense lines RX1 to RXN provided in parallel with each other along the detection surface 2 and intersecting the M drive lines, and (M×N) electrostatic capacitances C formed between the M drive lines and the N sense lines.

Figure 2:
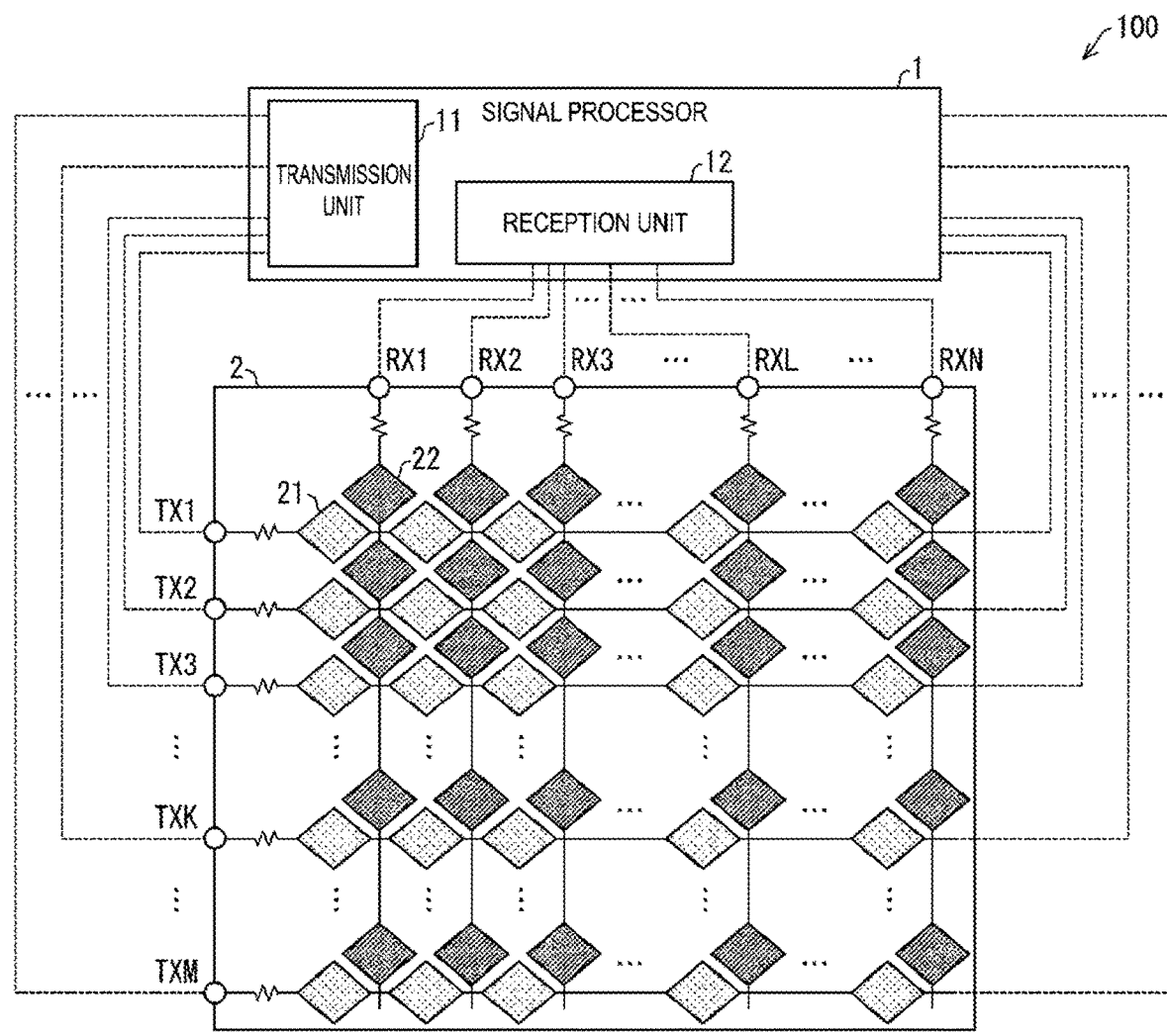
FIG. 2 is a diagram illustrating an example of an electrode pattern of a touch sensor unit of the touch input device according to the first embodiment of the disclosure.

FIG. 2 is a diagram illustrating an example of an electrode pattern of the touch sensor unit. Each of the drive lines TX1 to TXM has a plurality of drive electrode patterns 21, and each of the sense lines RX1 to RXN has a plurality of sense electrode patterns 22. For example, the drive line TX1 has a plurality of drive electrode patterns 21 disposed in the uppermost line in the horizontal direction. In addition, the sense line RX1 has a plurality of sense electrode patterns 22 disposed on the leftmost line in the vertical direction. As illustrated in FIG. 2, the plurality of drive electrode patterns 21 and the plurality of sense electrode patterns 22 are disposed alternately (zigzag), and the electrostatic capacitances C are formed between the drive electrode patterns 21 and the sense electrode patterns 22.

The transmission unit 11 outputs a first drive signal to at least one first drive line among the M drive lines TX1 to TXM. The reception unit 12 receives a sense signal from each of the N sense lines RX1 to RXN. The signal processor 1 detects changes in the plurality of (N in the present embodiment) electrostatic capacitances C between at least one (one in the present embodiment) first drive line and the N sense lines based on the sense signals received by the reception unit 12. The transmission unit 11 sequentially changes the first drive lines and outputs the first drive signals, and the signal processor 1 detects changes in the (M×N) electrostatic capacitances C based on the sense signals received by the reception unit 12 from the N sense lines RX1 to RXN. In the present embodiment, for example, the transmission unit 11 sequentially changes the first drive lines from the drive line TX1 to the drive line TXM and outputs the first drive signals. The order of the drive lines TX1 to TXM to which the first drive signals are output is arbitrarily set.

The transmission unit 11 outputs a first drive signal to at least one first drive line, and outputs a second drive signal having a phase opposite to the first drive signal to each of at least two (all (M−1) drive lines other than the first drive line in the present embodiment) second drive lines other than the first drive line among the M drive lines TX1 to TXM. At this time, the transmission unit 11 outputs the first drive signals and the second drive signals so that a first amplitude total which is a total value of the amplitudes of the first drive signals and a second amplitude total which is a total value of the amplitudes of the second drive signals are substantially equal to each other. At a time point in time when the transmission unit 11 outputs the first drive signals and the second drive signals, the first amplitude total is a value obtained by multiplying the amplitudes of the first drive signals by the number of first drive lines, and the second amplitude total is a value obtained by multiplying the amplitudes of the second drive signals by the number of second drive lines. Since the number of second drive lines is greater than the number of first drive lines, the amplitude of the second drive signal is smaller than the amplitude of the first drive signal.

Figure 3:
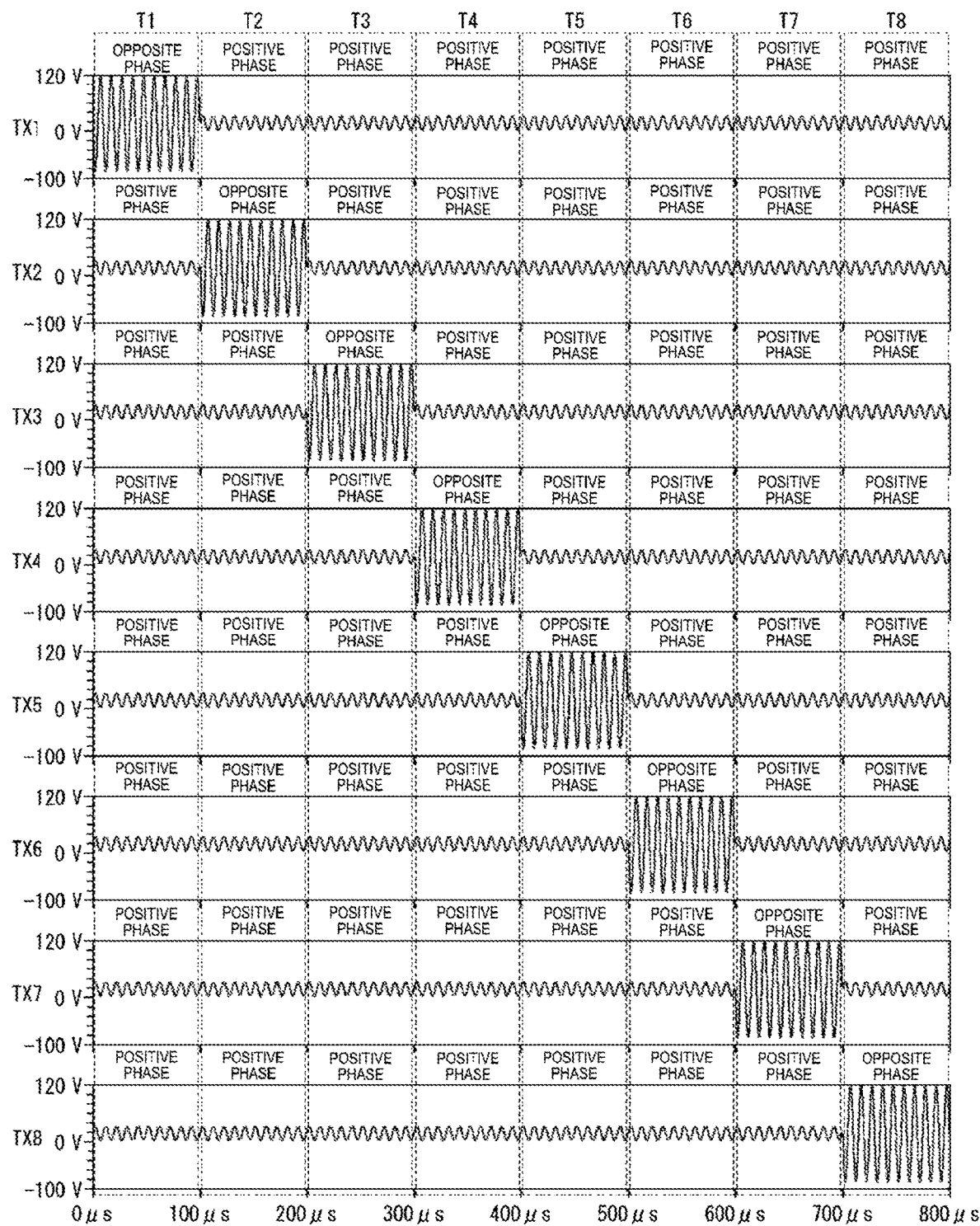
FIG. 3 is a diagram illustrating an example of waveforms of drive signals in the touch input device according to the first embodiment of the disclosure.

FIG. 3 is a diagram illustrating an example of waveforms of drive signals in the touch input device 100 according to the first embodiment of the disclosure. In FIG. 3 and other signal waveform diagrams (FIGS. 4, 6, and 7, and FIGS. 9 to 12), the vertical axis represents an amplitude (voltage) of a signal waveform, and the horizontal axis represents a time. Each of time periods T1 to T8 is, for example, 100 μs. In the present embodiment, since the number of first drive lines is one and the number of second drive lines is (M−1), the transmission unit 11 outputs the first drive signals and the second drive signals so that the amplitudes of the first drive signals (the first amplitude total in the present embodiment) are substantially equal to a value obtained by multiplying the amplitudes of the second drive signals by (M−1) (the second amplitude total in the present embodiment) in each of the time periods T1 to T8.

In FIG. 3, the number M of drive lines is set to 8 for simplification of description. Although it will be given below on the assumption that a first drive signal has an opposite phase and a second drive signal has a positive phase, the first drive signal can be represented as having a positive phase and the second drive signal can be represented as having an opposite phase.

In the time period T1, the transmission unit 11 outputs a first drive signal having an opposite phase to the drive line TX1 and outputs a second drive signal having a positive phase to each of the other seven drive lines TX2 to TX8. Similarly, in each of the time periods T2 to T8, the transmission unit 11 sequentially outputs a first drive signal having an opposite phase to each of the drive lines TX2 to TX8, and outputs a second drive signal having a positive phase to each of the other seven drive lines (second drive lines) other than the drive lines (first drive lines) to which the first drive signals are output. At this time, the transmission unit 11 outputs a first drive signal and a second drive signal so that the amplitudes of the first drive signals (first amplitude total) are substantially equal to a value obtained by multiplying the amplitudes of the second drive signals by (M−1) (second amplitude total).

A drive line to which a first drive signal is output in a certain time period (that is, a first drive line) is a drive line to be subjected to touch detection in the time period. Based on the sense signals received from the N respective sense lines RX1 to RXN, it is detected whether a region on the detection surface 2 which corresponds to a position where the first drive line is disposed has been touched. More specifically, based on a sense signal received from one of the N sense lines RX1 to RXN, it is detected whether a region on the detection surface 2 which corresponds to an intersection portion (including an intersection point and the vicinity thereof) between the first drive line and the sense line has been touched. Hereinafter, a region on the detection surface 2 which corresponds to a position where a certain drive line is disposed may be referred to as a disposition region of the drive line. Similarly, a region on the detection surface 2 which corresponds to a position where a certain sense line is disposed may be referred to as a disposition region of the sense line. A region on the detection surface 2 which corresponds to an intersection portion (including an intersection point and the vicinity thereof) between a certain drive line and a certain sense line may be referred to as an intersection region between the drive line and the sense line.

Figure 4:
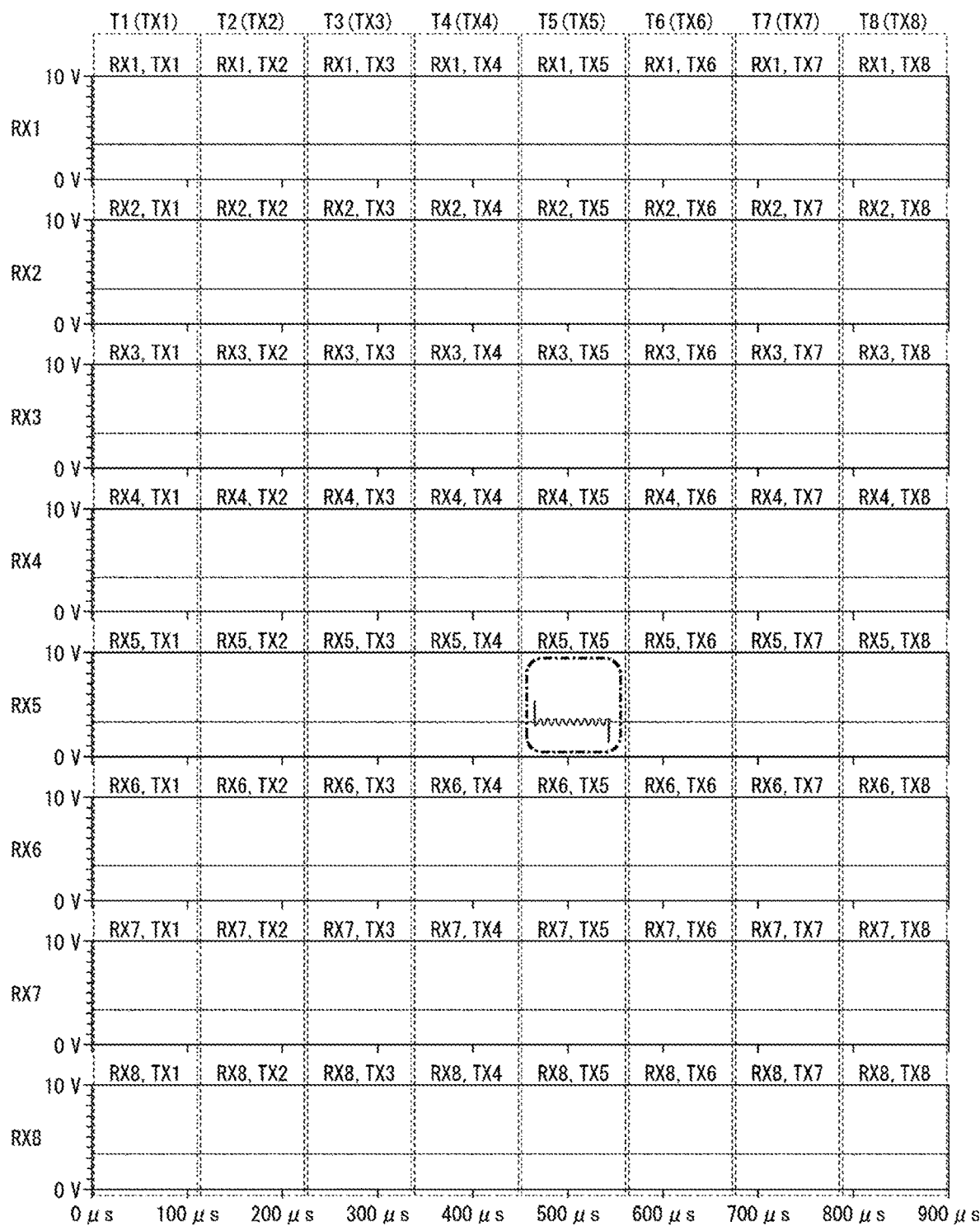
FIG. 4 is a diagram illustrating an example of waveforms of sense signals in the touch input device according to the first embodiment of the disclosure.

FIG. 4 is a diagram illustrating an example of waveforms of sense signals in the touch input device 100 according to the first embodiment of the disclosure. Time periods T1 to T8 in FIG. 4 correspond to the time periods T1 to T8 in FIG. 3, respectively. FIG. 4 illustrates a case where an intersection region between the drive line TX5 and the sense line RX5 is touched and a change occurs in an electrostatic capacitance C formed at an intersection portion between the drive line TX5 and the sense line RX5. Touching a certain region on the detection surface 2 may include not only touching the region with a finger or the like but also approaching the region with a finger or the like.

In the time period T1, a first drive line to be subjected to touch detection is the drive line TX1 (see FIG. 3). In the time period T1, the signal processor 1 detects whether an intersection region between the drive line TX1 and each of the sense lines RX1 to RX8 has been touched, based on the sense signals received from the respective sense lines RX1 to RX8 by the reception unit 12. The sense line RX1 is as follows. That is, since the disposition region of the sense line RX1 has not been touched on the detection surface 2, a waveform of a drive signal having an opposite phase which is output to the drive line TX1 (waveforms of first drive signals) and a waveform of a drive signal having a positive phase which is output to each of the drive lines TX2 to TX8 (waveforms of second drive signals) are attenuated at the equal attenuation rate and transmitted to the sense line RX1. For this reason, a balance between a first amplitude total and a second amplitude total is also maintained for the first drive signals and the second drive signals that have been transmitted to the sense line RX1. Thus, in the sense line RX1, a waveform of a drive signal having an opposite phase which is output to the drive line TX1 is offset by the sum of waveforms of drive signals having a positive phase which are output to the drive lines TX2 to TX8, and the reception unit 12 receives a sense signal having an amplitude of approximately zero from the sense line RX1 (it can be said that the reception unit 12 does not receive a sense signal). The signal processor 1 detects that an intersection region between the drive line TX1 and the sense line RX1 has not been touched based on the fact that the amplitude of the received sense signal is approximately zero and does not exceed a predetermined threshold value (hereinafter also referred to as a "detection threshold value"). In the specification of the present application, "waveforms of drive signals are transmitted to a sense line" means that a voltage based on a drive signal is applied to the sense line via an electrostatic capacitance C.

The same applies to each of the other sense lines RX2 to RX4 and RX6 to RX8 (referred to as "target sense lines" in this description) except for the sense line RX5. That is, since a disposition region of the target sense line has not been touched on the detection surface 2, a waveform of a drive signal having an opposite phase which is output to the drive line TX1 and a waveform of a drive signal having a positive phase which is output to each of the drive lines TX2 to TX8 are attenuated at the equal attenuation rate and transmitted to the target sense line. For this reason, a balance between a first amplitude total and a second amplitude total is also maintained for first drive signals and second drive signals that have been transmitted to the target sense line. Thus, in the target sense line, a waveform of a drive signal having an opposite phase which is output to the drive line TX1 is offset by the sum of the waveforms of the drive signals having a positive phase which are output to the drive lines TX2 to TX8, and the reception unit 12 receives a sense signal having an amplitude of approximately zero from the target sense line. The signal processor 1 detects that an intersection region between the drive line TX1 and the target sense line is not touched based on the fact that the amplitude of the received sense signal is approximately zero and does not exceed a detection threshold value.

In this manner, when there is no change in any of M (eight in the examples of FIGS. 3 and 4) electrostatic capacitances C between one of the N (eight in the examples of FIGS. 3 and 4) sense lines RX1 to RXN and the M (eight in the examples of FIGS. 3 and 4) drive lines TX1 to TXM, the amplitude of a sense signal received by the reception unit 12 from the one sense line is approximately zero.

On the other hand, the sense line RX5 is as follows. That is, each of intersection regions between the drive lines TX1 to TX4 and TX6 to TX8 and the sense line RX5 has not been touched on the detection surface 2, but an intersection region between the drive line TX5 and the sense line RX5 has been touched. Thus, a waveform of the drive signal having a positive phase (a waveform of a second drive signal) which is output to the drive line TX5 is attenuated more than usual and transmitted to the sense line RX5. Here, the amplitude of the waveform of the drive signal having a positive phase which is output to the drive line TX5 (the waveform of the drive signal attenuated more than usual and transmitted to the sense line RX5) is $1/(M-1)$ which is smaller than the amplitude of the waveform of the drive signal having an opposite phase which is output to the drive line TX1. Although M=8 in the examples of FIGS. 3 and 4, for example, M=120 in a touch input device provided in an actual display device. For this reason, a slight imbalance occurs between a first amplitude total and a second amplitude total for the first drive signal and the second drive signal that have been transmitted to the sense line RX5. As a result, in the sense line RX5, a waveform of a drive signal having an opposite phase which is output to the drive line TX1 is not completely offset by the sum of waveforms of drive signals having a positive phase which are output to the drive lines TX2 to TX8, but most of the amplitude thereof is canceled. Thus, the reception unit 12 receives a sense signal having a minute amplitude from the sense line RX5. The signal processor 1 detects that an intersection region between the drive line TX1 and the sense line RX5 has not been touched based on the fact that the amplitude of the received sense signal does not exceed a detection threshold value.

In this manner, when there is a change in one of the M (eight in the examples of FIGS. 3 and 4) electrostatic capacitances C between one of the N (eight in the examples of FIGS. 3 and 4) sense lines RX1 to RXN and the M (eight in the examples of FIGS. 3 and 4) drive lines TX1 to TXM, the sense signal received from the one sense line by the reception unit 12 has an amplitude that does not exceed the detection threshold value while a second drive signal is output to one of the M drive lines TX1 to TXM which forms the one electrostatic capacitance C. The detection threshold value is set in advance such that the amplitude of the sense signal received from the one sense line is smaller than the detection threshold value while the second drive signal is output to the one drive line when there is a change in the one electrostatic capacitance C.

In the time periods T2 to T4 and T6 to T8, the first drive lines to be subjected to touch detection are the drive lines TX2 to TX4 and TX6 to TX8 (see FIG. 3). The time periods T2 to T4 and T6 to T8 are the same as the time period T1. That is, in each of the sense lines RX1 to RX4 and RX6 to RX8, a waveform of a drive signal having an opposite phase which is output to the first drive line (any one of the drive lines TX2 to TX4 and TX6 to TX8) is offset by the sum of waveforms of drive signals having a positive phase which are output to the second drive lines (the seven drive lines except for the first drive line), and the reception unit 12 receives a sense signal having an amplitude of approximately zero. In the sense line RX5, most of the amplitude of the waveform of the drive signal having an opposite phase which is output to the first drive line is canceled by the sum of the waveforms of the drive signals having a positive phase which are output to the second drive lines, and the reception unit 12 receives a sense signal having a minute amplitude. In any case, the signal processor 1 detects that an intersection region between the first drive line and each of the sense lines RX1 to RX8 has not been touched, based on the fact that the amplitude of the received sense signal does not exceed a detection threshold value.

In the time period T5, a first drive line to be subjected to touch detection is the drive line TX5 (see FIG. 3). In the time period T5, the signal processor 1 detects whether an intersection region between the drive line TX5 and each of the sense lines RX1 to RX8 has been touched based on the sense signals received from the respective sense lines RX1 to RX8 by the reception unit 12. Each of the sense lines RX1 to RX4 and RX6 to RX8 (referred to as "target sense lines" in this description) is as follows. That is, since a disposition region of the target sense line has not been touched on the detection surface 2, a waveform of a drive signal having an opposite phase which is output to the drive line TX5 (waveforms of first drive signals) and a waveform of a drive signal having a positive phase which is output to each of the drive lines TX1 to TX4 and TX6 to TX8 (waveforms of second drive signals) are attenuated at the equal attenuation rate and transmitted to the target sense line. For this reason, in the target sense line, the waveform of the drive signal having an opposite phase which is output to the drive line TX5 is offset by the sum of the waveforms of the drive signals having a positive phase which are output to the drive lines TX1 to TX4 and TX6 to TX8, and the reception unit 12 receives a sense signal having an amplitude of approximately zero from the target sense line. The signal processor 1 detects that an intersection region of the drive line TX5 and the target sense line has not been touched based on the fact that the amplitude of the received sense signal is approximately zero and does not exceed a detection threshold value.

On the other hand, the sense line RX5 is as follows. That is, on the detection surface 2, the intersection regions of the drive lines TX1 to TX4 and TX6 to TX8 and the sense line RX5 are not touched, but the intersection region of the drive line TX5 and the sense line RX5 is touched. Thus, the waveform of the drive signal having an opposite phase (the waveforms of the first drive signals) which is output to the drive line TX5 is attenuated more than usual and transmitted to the sense line RX5. Here, the amplitude of the waveform of the drive signal having an opposite phase which is output to the drive line TX5 (the waveform of the drive signal attenuated more than usual and transmitted to the sense line RX5) is (M−1) times greater than the amplitude of the waveform of the drive signal having a positive phase which is output to each of the other drive lines TX1 to TX4 and TX6 to TX8. As described above, although M=8 in the examples of FIGS. 3 and 4, for example, M=120 in a touch input device provided in an actual display device. For this reason, a great imbalance occurs between a first amplitude total and a second amplitude total for the first drive signal and the second drive signal that have been transmitted to the sense line RX5. As a result, in the sense line RX5, a waveform of a drive signal having an opposite phase which is output to the drive line TX5 is canceled, and a portion of the sum of the waveforms of the drive signals having a positive phase which are output to the drive lines TX1 to TX4 and TX6 to TX8 remains. Thus, the reception unit 12 receives a sense signal having an amplitude equal to or greater than a detection threshold value from the sense line RX5. The signal processor 1 detects that an intersection region between the drive line TX5 and the sense line RX5 has been touched based on the fact that the amplitude of the received sense signal is equal to or greater than a detection threshold value.

In this manner, when there is a change in one of the M (eight in the examples of FIGS. 3 and 4) electrostatic capacitances C between one of the N (eight in the examples of FIGS. 3 and 4) sense lines RX1 to RXN and the M (eight in the examples of FIGS. 3 and 4) drive lines TX1 to TXM, the sense signal received from the one sense line by the reception unit 12 has an amplitude equal to or greater than the detection threshold value while the first drive signal is output to one of the M drive lines TX1 to TXM which forms the one electrostatic capacitance C. The detection threshold value is set in advance such that the amplitude of the sense signal received from the one sense line is equal to or greater than the detection threshold value while the first drive signal is output to the one drive line when there is a change in the one electrostatic capacitance C. Here, assuming that the amplitude of the first drive signal is an amplitude a, the amplitude of the second drive signal is an amplitude b, the amplitude of the sense signal received from the one sense line while the first drive signal is output to the one drive line is an amplitude c, and the amplitude of the sense signal received from the one sense line while the second drive signal is output to the one drive line is an amplitude d, a relationship of $(d/c)=(b/a)$ is established. The detection threshold value is set in advance based on, for example, the relationship and the number of first drive lines and the number of second drive lines.

As described above, according to the touch input device 100 of the present embodiment, the transmission unit 11 of the signal processor 1 outputs a first drive signal having an opposite phase to one of the M drive lines TX1 to TXM and outputs a second drive signal having a positive phase to each of the other (M−1) drive lines. At this time, the transmission unit 11 outputs the first drive signals and the second drive signals such that the amplitudes of the first drive signals (first amplitude total) are substantially equal to a value obtained by multiplying the amplitudes of the second drive signals by (M−1) (second amplitude total).

With the above-described configuration, the signal processor 1 of the present embodiment receives a sense signal having an amplitude of approximately zero from one sense line when there is no change in any of the electrostatic capacitances C formed by the one sense line (it can be said that the signal processor 1 does not receive a sense signal), and receives a sense signal having an amplitude (amplitude c) equal to or greater than a detection threshold value or a sense signal having an amplitude (amplitude d) smaller than the detection threshold value from the one sense line only when there is a change in any of the electrostatic capacitances C formed by the one sense line. Here, (d/c)=(b/a)=1/(M−1) for the amplitudes a to d, and a difference between the amplitude c and the amplitude d is great. Thus, the signal processor 1 can reliably determine whether the sense signal has the amplitude c or the amplitude d. Thus, according to the present embodiment, detection accuracy in the touch input device can be improved.

In addition, the signal processor 1 may determine whether the amplitude of the received sense signal exceeds the detection threshold value only when any one intersection region on the detection surface 2 is touched and the sense signal having the amplitude c or the amplitude d is received. Thus, signal processing in the signal processor 1 can be simplified, and the scales of an analog circuit and a logic circuit can be reduced. In addition, a report rate, which is the number of times of sensing of a touch in one second, is improved. Further, the influence of noise is reduced, a signal-to-noise ratio (SNR) is improved, processing performance is improved, and a hover touch and the like can be performed.

Second Embodiment

A configuration of a touch input device according to a second embodiment of the disclosure is the same as the configuration of the touch input device 100 according to the first embodiment illustrated in FIGS. 1 and 2. In the second embodiment, portions different from those in the first embodiment will be mainly described, and detailed description of the same configurations and functions will not be repeated.

In the present embodiment, M drive lines TX1 to TXM are divided into a plurality of blocks, and each of the plurality of blocks includes three or more drive lines of the M drive lines TX1 to TXM.

When a signal processor 1 according to the present embodiment outputs a first drive signal to one drive line among the M drive lines TX1 to TXM as a first drive line, the signal processor 1 outputs a second drive signal to each of at least two drive lines included in the same block as the first drive line as a second drive line. At this time, each of drive lines included in a block different from that of the first drive line corresponds to neither the first drive line nor the second drive line, and no drive signal is output to the drive line.

In other words, when the signal processor 1 outputs the first drive signal to one drive line included in one block among the plurality of blocks as the first drive line, the signal processor 1 outputs the second drive signal to each of at least two drive lines other than the one drive line included in the one block as the second drive line, and outputs neither the first drive signal nor the second drive signal to the drive lines included in the other blocks other than the one block among the plurality of blocks.

As in the first embodiment, the first drive signal and the second drive signal are output such that a first amplitude total, which is a value obtained by multiplying the amplitude of the first drive signal by the number of first drive lines, is substantially equal to a second amplitude total, which is a value obtained by multiplying the amplitude of the second drive signal by the number of second drive lines.

Figure 5:
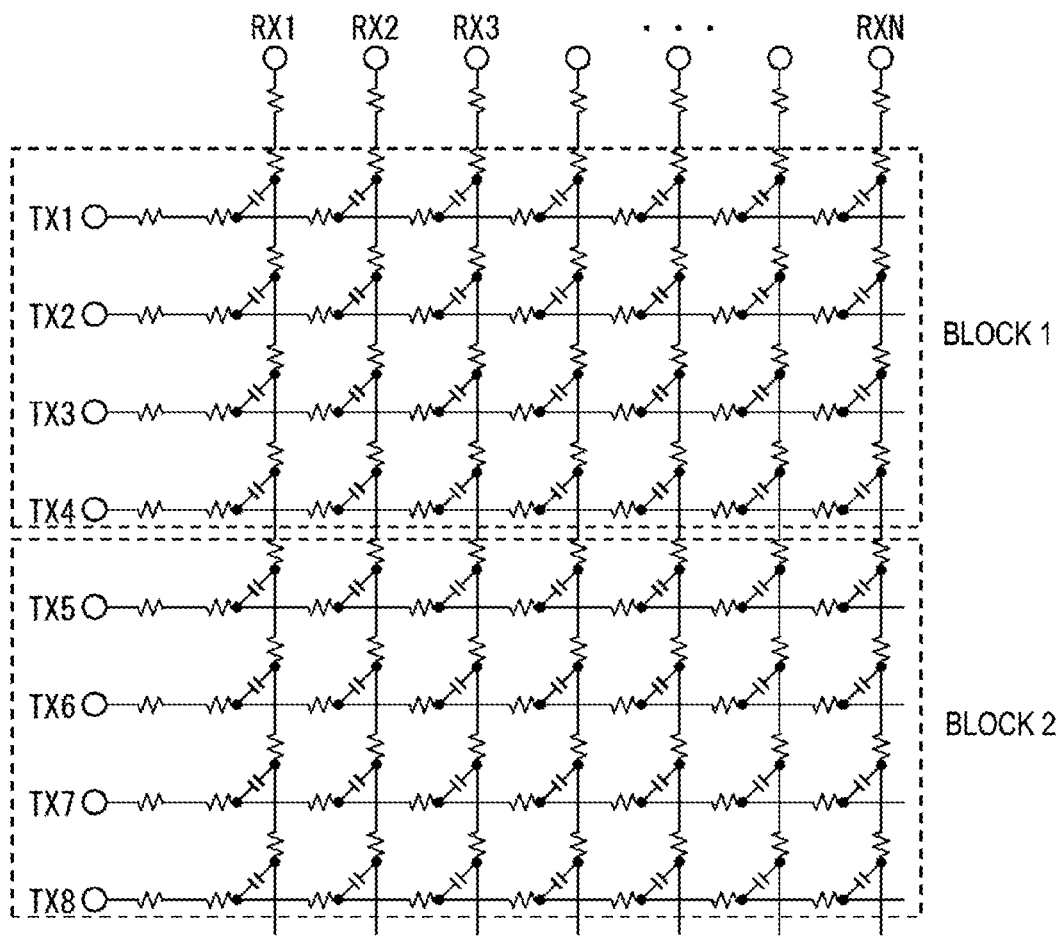
FIG. 5 is a diagram illustrating a configuration example of a touch sensor unit of a touch input device according to a second embodiment of the disclosure.

FIG. 5 is a diagram illustrating a configuration example of a touch sensor unit of the touch input device 100 according to the second embodiment of the disclosure. FIG. 5 illustrates a case where the number of drive lines M=8 and the eight drive lines are divided into two blocks, but the drive lines can be divided into any number of blocks. As illustrated in FIG. 5, the drive lines are divided such that four drive lines are included in each of a block 1 and a block 2. Drive lines TX1 to TX4 are included in the block 1, and drive lines TX5 to TX8 are included in the block 2.

Figure 6:
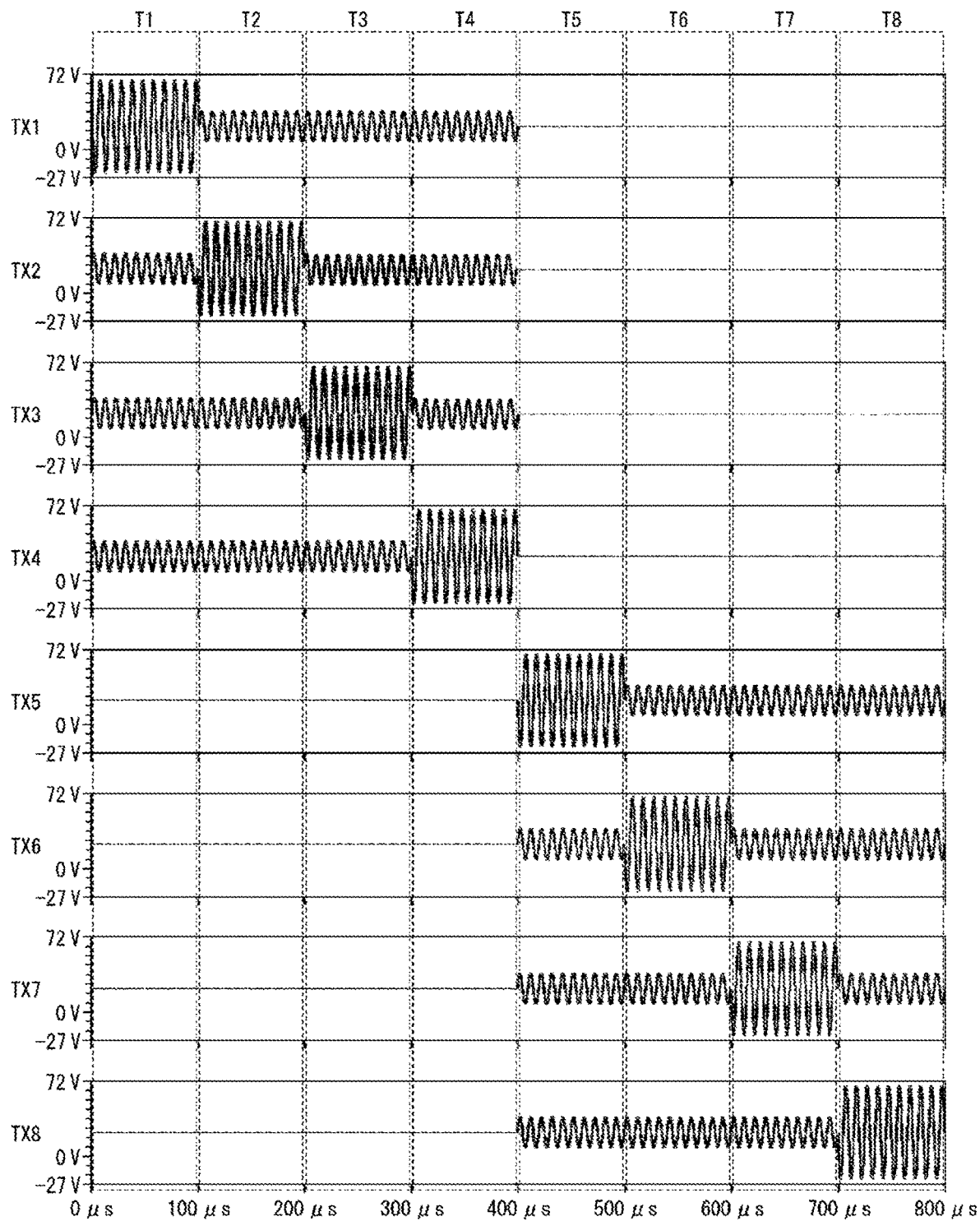
FIG. 6 is a diagram illustrating an example of waveforms of drive signals in the touch input device according to the second embodiment of the disclosure.

FIG. 6 is a diagram illustrating an example of waveforms of drive signals in the touch input device 100 according to the second embodiment of the disclosure. In a time period T1, a transmission unit 11 outputs a first drive signal having an opposite phase to the drive line TX1 included in the block 1, and outputs a second drive signal having a positive phase to each of the other three drive lines TX2 to TX4 included in the same block 1. In the time period T1, the transmission unit 11 does not output drive signals to any of the drive lines TX5 to TX8 included in a block (the block 2 in the examples of FIGS. 5 and 6) different from the block 1. At this time, the transmission unit 11 outputs the first drive signals and the second drive signals so that the amplitudes of the first drive signals (first amplitude total) are substantially equal to a value (second amplitude total) obtained by multiplying the amplitudes of the second drive signals by the number of second drive lines (three in the examples of FIGS. 5 and 6).

In time periods T2 to T4, similarly, the transmission unit 11 sequentially outputs a first drive signal having an opposite phase to each of the drive lines TX2 to TX4 included in the block 1, and outputs a second drive signal having a positive phase to each of the other three drive lines included in the same block 1. Also in the time periods T2 to T4, the transmission unit 11 does not output drive signals to any of the drive lines TX5 to TX8 included in a block (block 2) different from the block 1. The fact that the first drive signals and the second drive signals are output such that the first amplitude total and the second amplitude total are substantially equal to each other is the same as in the time period T1.

In the time period T5, the transmission unit 11 outputs a first drive signal having an opposite phase to the drive line TX5 included in the block 2, and outputs a second drive signal having a positive phase to each of the other three drive lines TX6 to TX8 included in the same block 2. In the time period T5, the transmission unit 11 does not output drive signals to any of the drive lines TX1 to TX4 included in a block (block 1 in the examples of FIGS. 5 and 6) different from the block 2. The fact that the first drive signals and the second drive signals are output such that the first amplitude total and the second amplitude total are substantially equal to each other is the same as in the time period T1.

In time periods T6 to T8, similarly, the transmission unit 11 sequentially outputs a first drive signal having an opposite phase to each of the drive lines TX6 to TX8 included in the block 2, and outputs a second drive signal having a positive phase to each of the other three drive lines included in the same block 2. Also in the time periods T6 to T8, the transmission unit 11 does not output drive signals to any of the drive lines TX1 to TX4 included in a block (block 1) different from the block 2. The fact that the first drive signals and the second drive signals are output such that the first amplitude total and the second amplitude total are substantially equal to each other is the same as in the time period T1.

Figure 7:
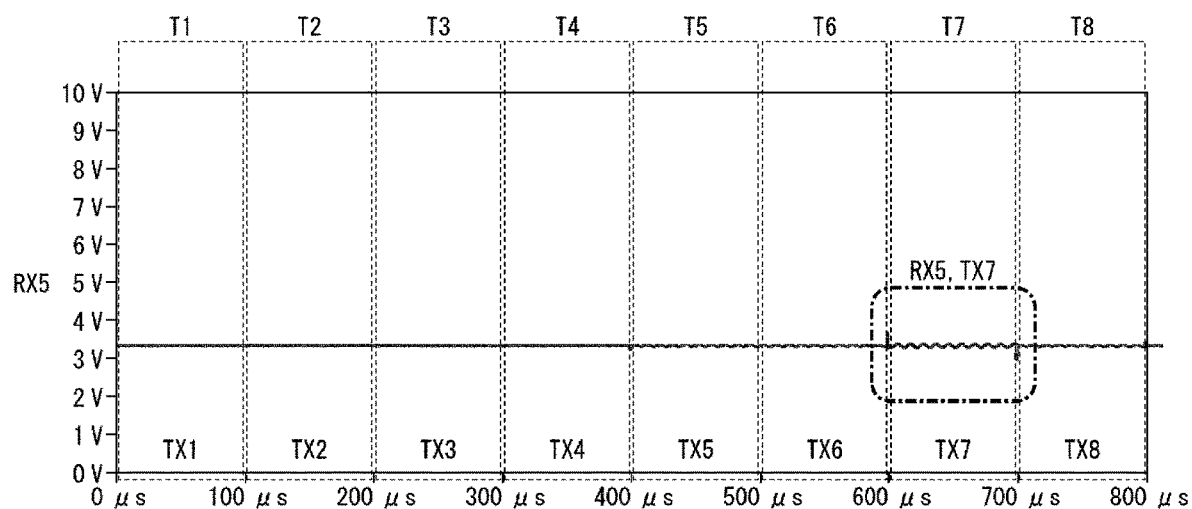
FIG. 7 is a diagram illustrating an example of waveforms of sense signals in the touch input device according to the second embodiment of the disclosure.

FIG. 7 is a diagram illustrating an example of waveforms of sense signals in the touch input device 100 according to the second embodiment of the disclosure. The time periods T1 to T8 in FIG. 7 correspond to the time periods T1 to T8 in FIG. 6, respectively. FIG. 7 illustrates a case where an intersection region between the drive line TX7 and the sense line RX5 is touched and a change occurs in an electrostatic capacitance C formed at an intersection portion between the drive line TX7 and the sense line RX5. In FIG. 7, waveforms of the sense lines RX1 to RX4 and RX6 to RX8 are omitted.

Sense signals received from each of the sense lines RX1 to RX4 and RX6 to RX8 (referred to as "target sense lines" in this description) are the same as those in the first embodiment. In other words, since a disposition region of the target sense line has not been touched, a balance between a first amplitude total and a second amplitude total is maintained for first drive signals and second drive signals that have been transmitted to the target sense line in any of the time periods T1 to T8. Thus, the reception unit 12 receives a sense signal having an amplitude of approximately zero from the target sense line in the time periods T1 to T8. Hereinafter, a sense signal received from the sense line RX5 will be described.

In the time periods T1 to T4, first drive lines to be subjected to touch detection are the drive lines TX1 to TX4 (see FIG. 6). In the time periods T1 to T4, drive lines other than the first drive lines among the drive lines included in the same block (block 1) as the first drive lines are second drive lines (see FIG. 6). That is, in the time periods T1 to T4, the first drive signals and the second drive signals are output to any of the drive lines TX1 to TX4 included in the block 1. Since none of intersection regions between the drive lines TX1 to TX4 and the sense line RX5 to which the first drive signals or the second drive signals are output has not been touched on a detection surface 2, a balance between a first amplitude total and a second amplitude total is maintained for the first drive signals and the second drive signals that have been transmitted to the sense line RX5 in any of the time periods T1 to T4. Thus, the reception unit 12 receives a sense signal having an amplitude of approximately zero from the sense line RX5 in the time periods T1 to T4. Since neither the first drive signals nor the second drive signals are output to the drive lines TX5 to TX8, the drive lines TX5 to TX8 are not involved in a waveform of the sense signal received by the reception unit 12 from the sense line RX5 in the time periods T1 to T4. The signal processor 1 detects that an intersection region between the first drive line (any one of the drive lines TX1 to TX4) and the sense line RX5 has not been touched based on the fact that the amplitude of the received sense signal is approximately zero and does not exceed a detection threshold value.

In this manner, when there is a change in one electrostatic capacitance C of the M (eight in the examples of FIGS. 6 and 7) electrostatic capacitances C between one of the N (eight in the examples of FIGS. 6 and 7) sense lines RX1 to RXN and the M (eight in the examples of FIGS. 6 and 7) drive lines TX1 to TXM, the amplitude of the sense signal received from the one sense line is approximately zero while neither the first drive signal nor the second drive signal is output to one drive line of the M drive lines which forms the one electrostatic capacitance C and the first drive signal is output to any drive line of the M drive lines. The same applies to the first embodiment described above and a third embodiment to be described below when there is a drive line to which neither the first drive signal nor the second drive signal is output.

In the time periods T5 to T8, first drive lines to be subjected to touch detection are the drive lines TX5 to TX8 (see FIG. 6). In the time periods T5 to T8, among the drive lines included in the same block (block 2) as the first drive lines, the drive lines other than the first drive lines are second drive lines (see FIG. 6). That is, in the time periods T5 to T8, the first drive signals and the second drive signals are output to any of the drive lines TX5 to TX8 included in the block 2. Since an intersection region between the drive line TX7 and the sense line RX5 has been touched on the detection surface 2, waveforms of the drive signals output to the drive line TX7 are attenuated more than usual and transmitted to the sense line RX5.

In the time periods T5, T6, and T8, a drive signal having a positive phase is output to the drive line TX7, and the waveform thereof (a waveform of a second drive signal) is attenuated more than usual and transmitted to the sense line RX5. For this reason, a slight imbalance occurs between a first amplitude total and a second amplitude total for the first drive signal and the second drive signal that have been transmitted to the sense line RX5. Thus, the reception unit 12 receives a sense signal having a minute amplitude from the sense line RX5. Since neither the first drive signals nor the second drive signals are output to the drive lines TX1 to TX4, the drive lines TX1 to TX4 are not involved in a waveform of the sense signal received by the reception unit 12 from the sense line RX5 in the time periods T5, T6, and T8 (the same is true of the time period T7 to be described later). The signal processor 1 detects that an intersection region between the first drive line (one of the drive lines TX5, TX6, and TX8) and the sense line RX5 has not been touched based on the fact that the amplitude of the received sense signal does not exceed a detection threshold value.

In the time period T7, a drive signal having an opposite phase is output to the drive line TX7, and the waveform thereof (a waveform of a first drive signal) is attenuated more than usual and transmitted to the sense line RX5. For this reason, a great imbalance occurs between a first amplitude total and a second amplitude total for the first drive signal and the second drive signal that have been transmitted to the sense line RX5. Thus, the reception unit 12 receives a sense signal having an amplitude equal to or greater than the detection threshold value from the sense line RX5. The signal processor 1 detects that an intersection region between the first drive line (drive line TX7) and the sense line RX5 has been touched based on the fact that the amplitude of the received sense signal is equal to or greater than the detection threshold value.

As described above, according to the touch input device 100 of the present embodiment, the amplitude of the first drive signal can be reduced by reducing the number of second drive lines in addition to obtaining the same effects as those in the first embodiment. Thereby, power consumption can be reduced in addition to reducing a circuit scale.

In the present embodiment, the M drive lines are divided into a plurality of blocks so that a plurality of adjacent drive lines are included in the same block and the number of drive lines included in each block is the same, but the disclosure is not limited thereto, and the M drive lines may be divided in any manner. A plurality of drive lines that are not adjacent to each other may be included in the same block, or different numbers of drive lines may be included in each block.

Third Embodiment

A configuration of a touch input device according to a third embodiment of the disclosure is the same as the configuration of the touch input device 100 according to the first embodiment illustrated in FIG. 1. In the third embodiment, portions different from those in the first embodiment will be mainly described, and detailed description of the same configurations and functions will not be repeated.

In the present embodiment, M drive lines TX1 to TXM are divided into a plurality of blocks, and each of the plurality of blocks includes three or more drive lines of the M drive lines TX1 to TXM.

A signal processor 1 according to the present embodiment specifies an intersection region that is touched through a plurality of detection steps including a first detection step and a second detection step. The first detection step is an initial detection step, and the second detection step is a final detection step. Other detection steps may be provided between the first detection step and the second detection step. In the first detection step, the signal processor 1 specifies a block (hereinafter also referred to as a "touch-related block") including a drive line related to the touched intersection region among the plurality of blocks. Here, the drive line related to the touched intersection region refers to a drive line constituting an intersection portion corresponding to the touched intersection region. When a touch-related block is not specified, a detection result indicating that no intersection region on a detection surface 2 has been touched is obtained.

When m drive lines (m is an integer of 3 or greater) included in each block are further divided into a plurality of sub-blocks, the signal processor 1 specifies a sub-block (hereinafter also referred to as a "touch-related sub-block") including a drive line related to the touched intersection region among the plurality of sub-blocks included in the touch-related block specified in the first detection step in a third detection step subsequent to the first detection step. At this time, a drive signal is not output to the drive line that is not included in the touch-related block.

When there is no third detection step, and the second detection step follows the first detection step, the signal processor 1 performs the same touch detection processing as that in the first embodiment on the m drive lines included in the touch-related block specified in the first detection step to specify a touched intersection region in the second detection step. At this time, a drive signal is not output to the drive line that is not included in the touch-related block. When there is a third detection step, and the second detection step follows the third detection step, the signal processor 1 performs the same touch detection processing as that in the first embodiment on n (n is an integer of 3 or greater) drive lines included in the touch-related sub-block specified in the third detection step to specify a touched intersection region in the second detection step. At this time, a drive signal is not output to the drive line that is not included in the touch-related sub-block. The n drive lines included in each sub-block may be further divided into a plurality of sub-blocks, and a fourth detection step may be provided between the third detection step and the second detection step.

Figure 9:
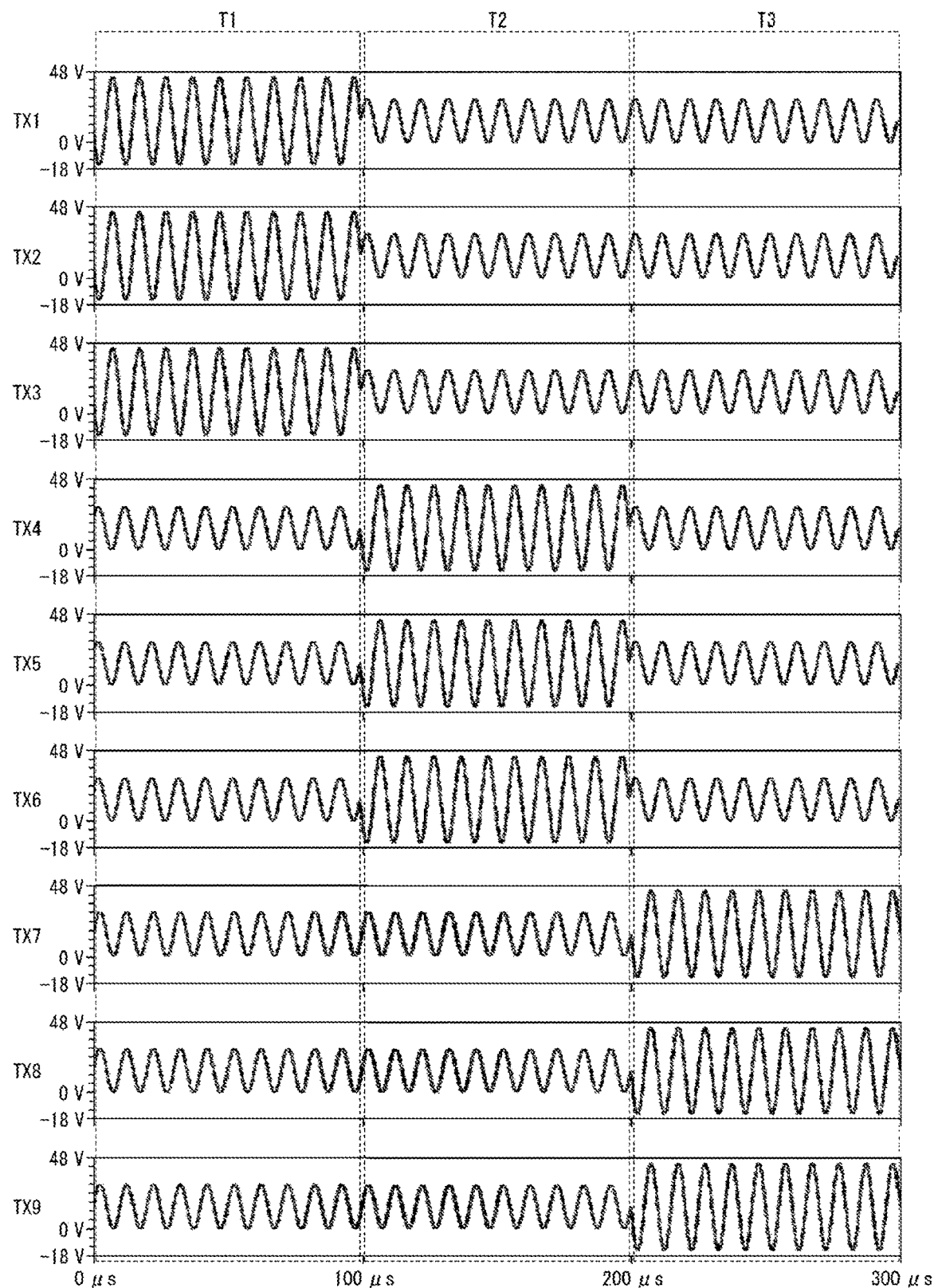
FIG. 9 is a diagram illustrating an example of waveforms of drive signals at a first detection step in the touch input device according to the third embodiment of the disclosure.

In the first detection step, for example, in a certain time period, all drive lines included in one target block are first drive lines to be subjected to touch detection, and all drive lines included in at least two blocks (all of the blocks other than the target block in the example of FIG. 9) other than the target block are second drive lines. Similarly, in the third detection step, for example, in a certain time period, all drive lines included in one target sub-block are first drive lines to be subjected to touch detection, and all drive lines included in at least two sub-blocks (for example, all of the sub-blocks other than the target sub-block) other than the target sub-block among the plurality of sub-blocks included in the target block are second drive lines.

In other words, the signal processor 1 of the present embodiment outputs a first drive signal to each of the plurality of (m) drive lines included in one target block among the plurality of blocks as a first drive line, and outputs a second drive signal to each of the plurality of drive lines included in at least two blocks other than the target block among the plurality of blocks as a second drive line. Then, the signal processor 1 performs first processing of detecting a change in electrostatic capacitance related to a target block based on sense signals received from the respective N sense lines while sequentially changing a target block. In the first processing, it is determined whether the target block is a touch-related block. Here, the electrostatic capacitance related to the target block includes (m×N) electrostatic capacitances C between the m drive lines included in the target block and the N sense lines. When there is a change in any of the (m×N) electrostatic capacitances C, it is determined that there is a change in the electrostatic capacitance related to the target block, and the target block is determined to be a touch-related block. On the other hand, when there is no change in any of the (m×N) electrostatic capacitances C, it is determined that there is no change in the electrostatic capacitance related to the target block, and it is determined that the target block is not a touch-related block.

When it is detected that there is a change in the electrostatic capacitance related to the target block, that is, when the target block is specified as a touch-related block, and when the plurality of (m) drive lines included in the target block are further divided into a plurality of sub-blocks, the signal processor 1 of the present embodiment performs the first processing by sequentially changing a target block to the plurality of sub-blocks as the plurality of blocks. In other words, the signal processor 1 outputs a first drive signal to each of the plurality of (n) drive lines included in one target sub-block among the plurality of sub-blocks included in the touch-related block as a first drive line. At the same time, the signal processor 1 outputs a second drive signal to each of the plurality of drive lines included in at least two sub-blocks other than the target sub-block among the plurality of sub-blocks included in the touch-related block as a second drive line. Then, the signal processor 1 performs processing of detecting a change in electrostatic capacitance related to the target sub-block based on the sense signals received from the respective N sense lines while sequentially changing a target sub-block. In this processing, it is determined whether the target sub-block is a touch-related sub-block. A method of determining whether a target sub-block is a touch-related sub-block is substantially the same as the method of determining whether a target block is a touch-related block.

Figure 11:
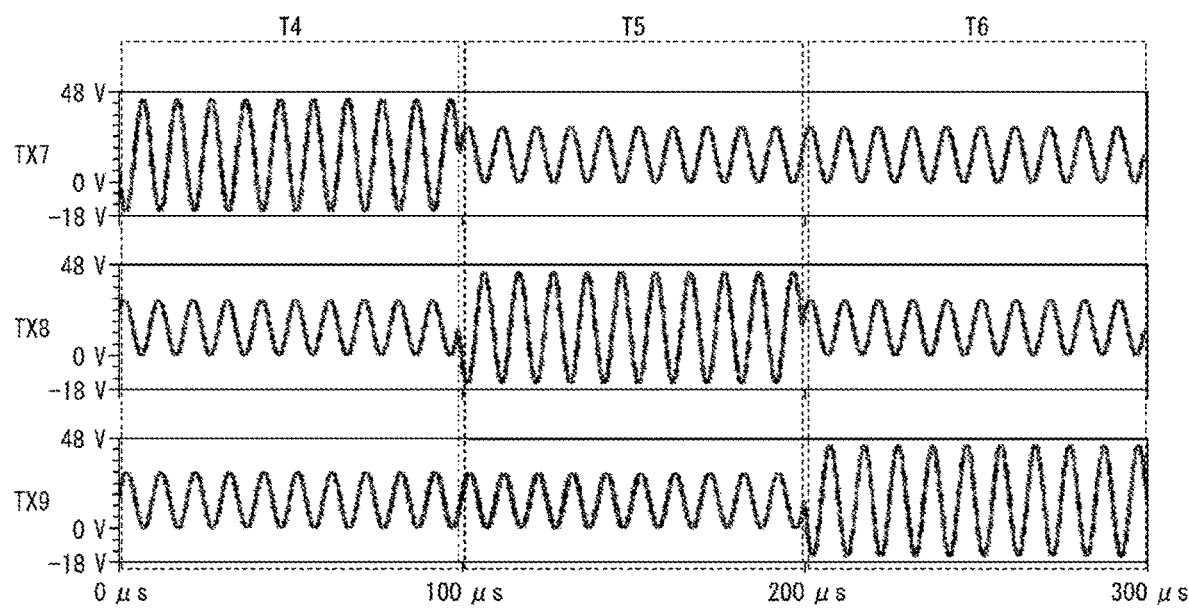
FIG. 11 is a diagram illustrating an example of waveforms of drive signals at a second detection step in the touch input device according to the third embodiment of the disclosure.

In the second detection step, in a certain time period, one drive line included in a touch-related block is a first drive line to be subjected to touch detection, and at least two drive lines (all drive lines other than the first drive line in the example of FIG. 11), which are included in the touch-related block, other than the first drive line are second drive lines.

In other words, when it is detected that there is a change in the electrostatic capacitance related to the target block, that is, when the target block is specified as a touch-related block, the signal processor 1 according to the present embodiment outputs a first drive signal to one target drive line included in the target block as a first drive line, and outputs a second drive signal to at least two drive lines other than the target drive line included in the target block as second drive lines. Then, the signal processor 1 performs second processing of detecting changes in the N electrostatic capacitances C between the target drive line and the N sense lines based on the sense signals received from the respective N sense lines while sequentially changing a target drive line. In the second processing, it is determined whether the target drive line is a drive line related to an intersection region being touched.

In any detection step, as in the first embodiment, the first drive signal and the second drive signal are output such that a first amplitude total, which is a value obtained by multiplying the amplitude of the first drive signal by the number of first drive lines, is substantially equal to a second amplitude total, which is a value obtained by multiplying the amplitude of the second drive signal by the number of second drive lines.

Figure 8:
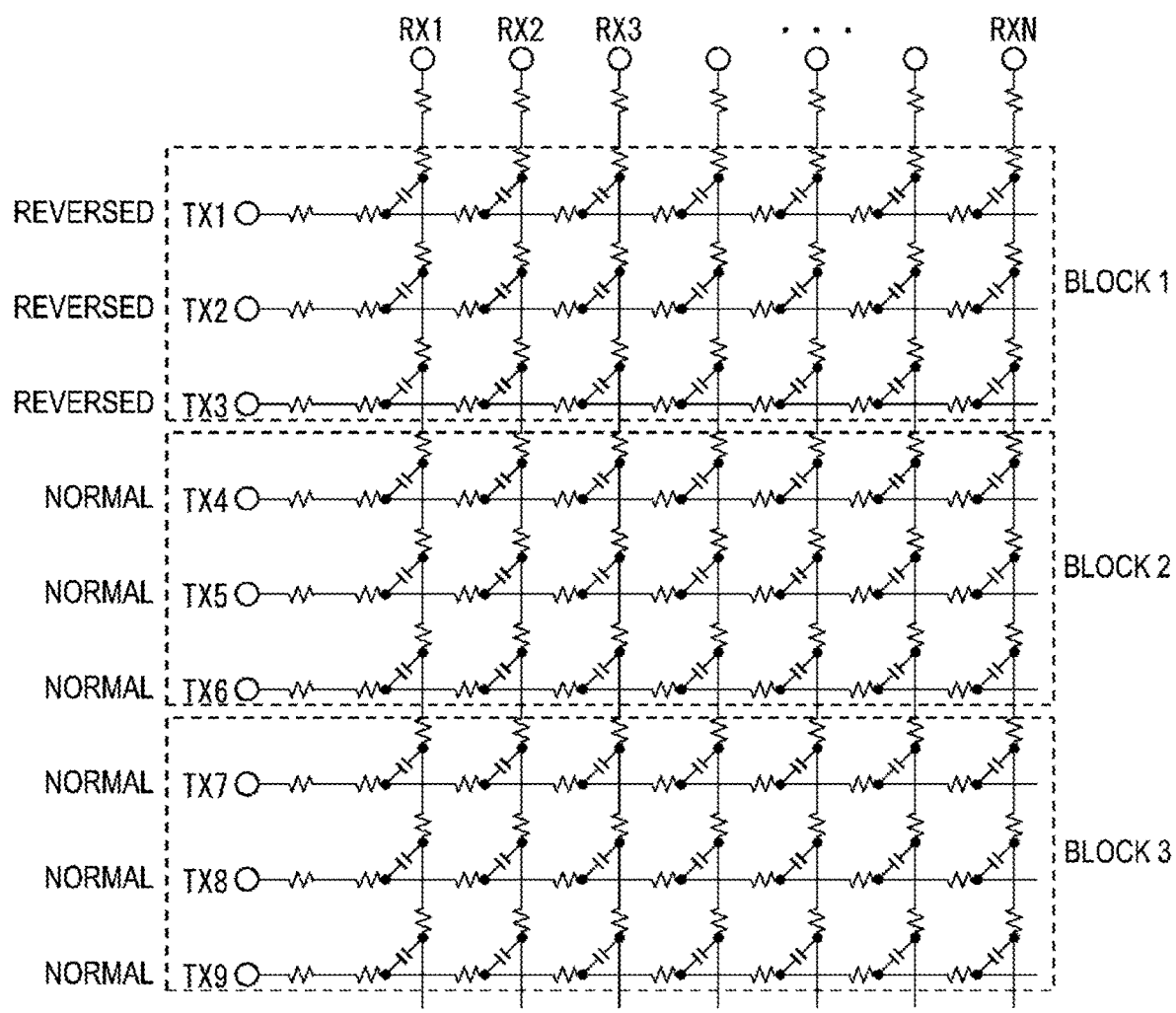
FIG. 8 is a diagram illustrating a configuration example of a touch sensor unit of a touch input device according to a third embodiment of the disclosure.

FIG. 8 is a diagram illustrating a configuration example of a touch sensor unit of the touch input device 100 according to the third embodiment of the disclosure. FIG. 8 illustrates a case where the number of drive lines M=9 and the nine drive lines are divided into three blocks, but the drive lines can be divided into any number of blocks. As illustrated in FIG. 8, the drive lines are divided such that three drive lines are included in each of a block 1 to a block 3. Drive lines TX1 to TX3 are included in the block 1, drive lines TX4 to TX6 are included in the block 2, and drive lines TX7 to TX9 are included in the block 3.

FIG. 9 is a diagram illustrating an example of waveforms of drive signals in a first detection step in the touch input device 100 according to the third embodiment of the disclosure. In a time period T1, a transmission unit 11 outputs a first drive signal having an opposite phase to each of the drive lines TX1 to TX3 included in the block 1 set as a target block, and outputs a second drive signal having a positive phase to each of the drive lines TX4 to TX9 included in the blocks other than the target block (the block 2 and the block 3 in the examples of FIGS. 8 and 9). At this time, the transmission unit 11 outputs the first drive signals and the second drive signals so that a value (first amplitude total) obtained by multiplying the amplitudes of the first drive signals by the number of first drive lines (three in the examples of FIGS. 8 and 9) is substantially equal to a value (second amplitude total) obtained by multiplying the amplitudes of the second drive signals by the number of second drive lines (six in the examples of FIGS. 8 and 9).

In a time period T2, the transmission unit 11 outputs a first drive signal having an opposite phase to each of the drive lines TX4 to TX6 included in the block 2 set as the target block next to the block 1, and outputs a second drive signal having a positive phase to each of the drive lines TX1 to TX3 and TX7 to TX9 included in the blocks other than the target block (the block 1 and the block 3 in the examples of FIGS. 8 and 9). The fact that the first drive signals and the second drive signals are output such that the first amplitude total and the second amplitude total are substantially equal to each other is the same as in the time period T1.

In a time period T3, the transmission unit 11 outputs a first drive signal having an opposite phase to each of the drive lines TX7 to TX9 included in the block 3 set as the target blocks next to the block 2, and outputs a second drive signal having a positive phase to each of the drive lines TX1 to TX6 included in the blocks (the block 1 and the block 2 in the examples of FIGS. 8 and 9) other than the target block. The fact that the first drive signals and the second drive signals are output such that the first amplitude total and the second amplitude total are substantially equal to each other is the same as in the time period T1.

Figure 10:
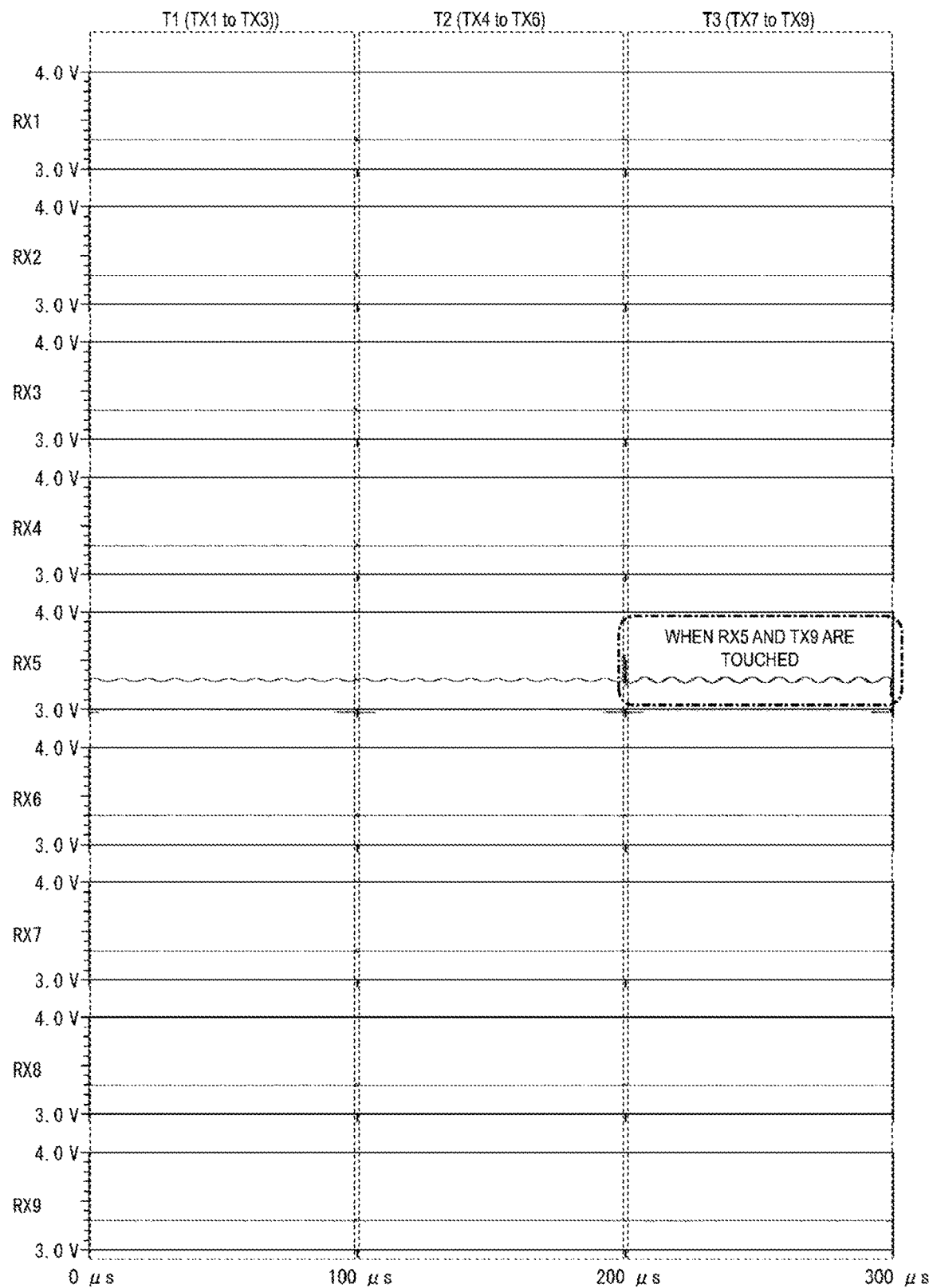
FIG. 10 is a diagram illustrating an example of waveforms of sense signals at the first detection step in the touch input device according to the third embodiment of the disclosure.

FIG. 10 is a diagram illustrating an example of waveforms of sense signals in the first detection step in the touch input device 100 according to the third embodiment of the disclosure. Time periods T1 to T3 in FIG. 10 correspond to the time periods T1 to T3 in FIG. 9, respectively. FIG. 10 illustrates a case where an intersection region between the drive line TX9 and the sense line RX5 is touched, and a change occurs in an electrostatic capacitance C formed at an intersection portion between the drive line TX9 and the sense line RX5.

In the time period T1, a first drive signal is output to each of the three drive lines TX1 to TX3 included in the block 1 (see FIG. 9). Thus, in the time period T1, a bundle of the three drive lines TX1 to TX3 is subjected to touch detection. In the time period T1, the signal processor 1 detects whether an intersection region between the bundle of the drive lines TX1 to TX3 and each of the sense lines RX1 to RX9 has been touched based on the sense signals received from the respective sense lines RX1 to RX9 by the reception unit 12. For example, when it is detected that the intersection region between the bundle of the drive lines TX1 to TX3 and the sense line RX1 has been touched, it means that an intersection region between any one of the drive lines TX1 to TX3 and the sense line RX1 has been touched.

Each of the sense lines RX1 to RX4 and RX6 to RX9 (referred to as "target sense lines" in this description) except for the sense line RX5 is as follows. That is, since a disposition region of the target sense line has not been touched on the detection surface 2, a waveform of a drive signal having an opposite phase (a waveform of a first drive signal) which is output to each of the drive lines TX1 to TX3 and a waveform of a drive signal having a positive phase (a waveform of a second drive signal) which is output to each of the drive lines TX4 to TX9 are attenuated at the same attenuation rate and transmitted to the target sense line. For this reason, a balance between a first amplitude total and a second amplitude total is also maintained for first drive signals and second drive signals that have been transmitted to the target sense line. Thus, in the target sense line, the sum of the waveforms of the drive signals having an opposite phase which are output to the drive lines TX1 to TX3 are offset by the sum of the waveforms of the drive signals having a positive phase which are output to the drive lines TX4 to TX9, and the reception unit 12 receives a sense signal having an amplitude of approximately zero from the target sense line. The signal processor 1 detects that an intersection region between the bundle of the drive lines TX1 to TX3 and the target sense line has not been touched, that is, detects that none of the intersection regions between the drive lines TX1 to TX3 and the target sense line has been touched based on the fact that the amplitude of the received sense signal is approximately zero and does not exceed a detection threshold value.

In this manner, when there is no change in any one of the M (nine in the examples of FIGS. 9 and 10) electrostatic capacitances C between one of the N (nine in the examples of FIGS. 9 and 10) sense lines and the M (nine in the examples of FIGS. 9 and 10) drive lines, the amplitude of a sense signal received by the reception unit 12 from the one sense line is approximately zero.

On the other hand, the sense line RX5 is as follows. That is, each of intersection regions between the drive lines TX1 to TX8 and the sense line RX5 has not been touched on the detection surface 2, but an intersection region between the drive line TX9 and the sense line RX5 has been touched. Thus, a waveform of the drive signal having a positive phase (a waveform of a second drive signal) which is output to the drive line TX9 is attenuated more than usual and transmitted to the sense line RX5. Here, the amplitude of the waveform of the drive signal having a positive phase which is output to the drive line TX9 (the waveform of the drive signal attenuated more than usual and transmitted to the sense line RX5) is m/(M−m) (½ in the example of FIG. 9) which is smaller than the amplitude of the waveform of the drive signal having an opposite phase which is output to each of the drive lines TX1 to TX3. For this reason, a slight imbalance occurs between a first amplitude total and a second amplitude total for the first drive signal and the second drive signal that have been transmitted to the sense line RX5. As a result, in the sense line RX5, the sum of waveform of drive signals having an opposite phase which are output to the drive lines TX1 to TX3 is not completely offset by the sum of waveforms of drive signals having a positive phase which are output to the drive lines TX4 to TX9, but most of the sum is canceled. Thus, the reception unit 12 receives a sense signal having a minute amplitude from the sense line RX5. The signal processor 1 detects that an intersection region between the bundle of the drive lines TX1 to TX3 and the sense line RX5 has not been touched, that is, detects that any of the intersection regions between the drive lines TX1 to TX3 and the sense line RX5 has not been touched, based on the fact that the amplitude of the received sense signal does not exceed the detection threshold value.

In this manner, when there is a change in one of the M (nine in the examples of FIGS. 9 and 10) electrostatic capacitances C between one of the N (nine in the examples of FIGS. 9 and 10) sense lines and the M (nine in the examples of FIGS. 9 and 10) drive lines, the sense signal received from the one sense line by the reception unit 12 has an amplitude that does not exceed the detection threshold value while a second drive signal is output to each of the plurality of drive lines included in the block including the one drive line of the M drive lines which forms the one electrostatic capacitance C.

In the time period T2, a first drive signal is output to each of the three drive lines TX4 to TX6 included in the block 2 (see FIG. 9). Thus, in the time period T2, a bundle of the three drive lines TX4 to TX6 is subjected to touch detection. The time period T2 is the same as the time period T1. That is, in each of the sense lines RX1 to RX4 and RX6 to RX9, the sum of the waveforms of the drive signals having an opposite phase which are output to the first drive lines (the drive lines TX4 to TX6) is offset by the sum of the waveforms of the drive signals having a positive phase which are output to the second drive lines (the drive lines TX1 to TX3 and TX7 to TX9), and the reception unit 12 receives a sense signal having an amplitude of approximately zero. In the sense line RX5, most of the sum of the waveforms of the drive signals having an opposite phase which are output to the first drive lines is canceled by the sum of the waveforms of the drive signals having a positive phase which are output to the second drive lines, and the reception unit 12 receives a sense signal having a minute amplitude. In any case, the signal processor 1 detects that an intersection region between the bundle of the drive lines TX4 to TX6 and each of the sense lines RX1 to RX9 has not been touched, that is, detects that none of the intersection regions between the drive lines TX4 to TX6 and the sense lines RX1 to RX9 has been touched based on the fact that the amplitude of the received sense signal does not exceed a detection threshold value.

In the time period T3, a first drive signal is output to each of the three drive lines TX7 to TX9 included in the block 3 (see FIG. 9). Thus, in the time period T3, a bundle of the three drive lines TX7 to TX9 is subjected to touch detection. In the time period T3, the signal processor 1 detects whether an intersection region between the bundle of the drive lines TX7 to TX9 and each of the sense lines RX1 to RX9 has been touched based on the sense signals received from the respective sense lines RX1 to RX9. Each of the sense lines RX1 to RX4 and RX6 to RX9 (referred to as "target sense lines" in this description) is as follows. That is, since a disposition region of the target sense line has not been touched on the detection surface 2, a waveform of a drive signal having an opposite phase (a waveform of a first drive signal) which is output to each of the drive lines TX7 to TX9 and a waveform of a drive signal having a positive phase (a waveform of a second drive signal) which is output to each of the drive lines TX1 to TX6 are attenuated at the same attenuation rate and transmitted to the target sense line. For this reason, in the target sense line, the sum of the waveforms of the drive signals having an opposite phase which are output to the drive lines TX7 to TX9 is offset by the sum of the waveforms of the drive signals having a positive phase which are output to the drive lines TX1 to TX6, and the reception unit 12 receives a sense signal having an amplitude of approximately zero from the target sense line. The signal processor 1 detects that an intersection region between the bundle of the drive lines TX7 to TX9 and the target sense line has not been touched, that is, detects that none of the intersection regions between the drive lines TX7 to TX9 and the target sense line has been touched based on the fact that the amplitude of the received sense signal is approximately zero and does not exceed the detection threshold value.

On the other hand, the sense line RX5 is as follows. That is, each of intersection regions between the drive lines TX1 to TX8 and the sense line RX5 has not been touched on the detection surface 2, but an intersection region between the drive line TX9 and the sense line RX5 has been touched. Thus, a waveform of the drive signal having an opposite phase (a waveform of a first drive signal) which is output to the drive line TX9 is attenuated more than usual and transmitted to the sense line RX5. Here, the amplitude of the waveform of the drive signal having an opposite phase which is output to the drive line TX9 (the waveform of the drive signal attenuated more than usual and transmitted to the sense line RX5) is (M−m)/m times (twice in the example of FIG. 9) greater than the amplitude of the waveform of the drive signal having a positive phase which is output to each of the other drive lines TX1 to TX6. For this reason, a great imbalance occurs between a first amplitude total and a second amplitude total for the first drive signal and the second drive signal that have been transmitted to the sense line RX5. As a result, in the sense line RX5, the sum of the waveforms of the drive signals having an opposite phase which are output to the drive lines TX7 to TX9 is canceled out, and a portion of the sum of the waveforms of the drive signals having a positive phase which are output to the drive lines TX1 to TX6 remains. Thus, the reception unit 12 receives a sense signal having an amplitude equal to or greater than a detection threshold value from the sense line RX5. The signal processor 1 detects that an intersection region between the bundle of the drive lines TX7 to TX9 and the sense line RX5 has been touched, that is, detects that an intersection region between any one of the drive lines TX7 to TX9 and the sense line RX5 has been touched, based on the fact that the amplitude of the received sense signal is equal to or greater than a detection threshold value. The signal processor 1 specifies the block 3 set as a target block in the time period T3 as a touch-related block.

In this manner, when there is a change in one of the M (nine in the examples of FIGS. 9 and 10) electrostatic capacitances C between one of the N (nine in the examples of FIGS. 9 and 10) sense lines and the M (nine in the examples of FIGS. 9 and 10) drive lines, the sense signal received from the one sense line by the reception unit 12 has an amplitude equal to or greater than the detection threshold value while a first drive signal is output to each of the plurality of drive lines included in the block including the one drive line of the M drive lines which forms the one electrostatic capacitance C.

FIG. 11 is a diagram illustrating an example of waveforms of drive signals in a second detection step in the touch input device 100 according to the third embodiment of the disclosure. In the second detection step, the signal processor 1 performs the same touch detection processing as that in the first embodiment on m (three in this example) drive lines (the drive lines TX7 to TX9 in this example) included in the touch-related block (the block 3 in this example) specified in the first detection step to specify a touched intersection region. At this time, a drive signal is not output to the drive lines that are not included in the touch-related block (the drive lines TX1 to TX6 in this example).

In time periods T4 to T6, the transmission unit 11 sequentially outputs a first drive signal having an opposite phase to each of the drive lines TX7 to TX9 included in the block 3 which is a touch-related block, and outputs a second drive signals having a positive phase to each of the other drive lines included in the block 3. At this time, transmission unit 11 does not output a drive signal to the drive lines TX1 to TX6 included in the block 1 and the block 2 other than the touch-related block. The fact that the first drive signal and the second drive signal are output such that the first amplitude total and the second amplitude total are substantially equal to each other is the same as in the first embodiment.

Figure 12:
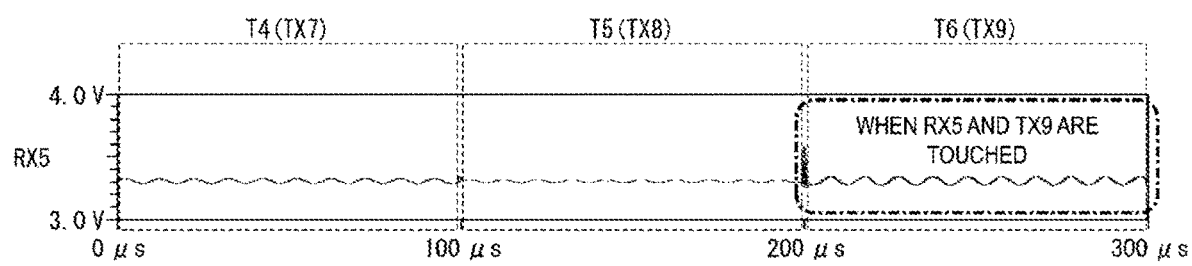
FIG. 12 is a diagram illustrating an example of waveforms of sense signals at the second detection step in the touch input device according to the third embodiment of the disclosure.

FIG. 12 is a diagram illustrating an example of waveforms of sense signals in the second detection step in the touch input device 100 according to the third embodiment of the disclosure. Time periods T4 to T6 in FIG. 12 correspond to the time periods T4 to T6 in FIG. 11, respectively. Similarly to FIG. 10, FIG. 12 illustrates a case where an intersection region between the drive line TX9 and the sense line RX5 has been touched and a change occurs in an electrostatic capacitance C formed at an intersection portion between the drive line TX9 and the sense line RX5. Waveforms of sense signals of sense lines other than the sense line RX5 are omitted. Similarly to the first embodiment, since a disposition region of the sense line other than the sense line RX5 has not been touched on the detection surface 2, the sum of waveforms of drive signals having an opposite phase is offset by the sum of waveforms of drive signals having a positive phase in the sense line other than the sense line RX5, and the reception unit 12 receives a sense signal having an amplitude of approximately zero from the sense line.

The sense line RX5 is the same as that in the first embodiment. That is, in the time periods T4 and T5, since a waveform of a drive signal having a positive phase (a waveform of a second drive signal) which is output to the drive line TX9 is attenuated more than usual and transmitted to the sense line RX5, the reception unit 12 receives a sense signal having a minute amplitude from the sense line RX5. The signal processor 1 detects that an intersection region between a first drive line (the drive line TX7 in the time period T4 and the drive line TX8 in the time period T5) and the sense line RX5 has not been touched based on the fact that the amplitude of the received sense signal does not exceed a detection threshold value. In the time period T6, a waveform of a drive signal having an opposite phase (a waveform of a first drive signal) which is output to the drive line TX9 is attenuated more than usual and transmitted to the sense line RX5. Thus, the reception unit 12 receives a sense signal having an amplitude equal to or greater than the detection threshold value from the sense line RX5. The signal processor 1 detects that an intersection region between the drive line TX9, which is a first drive line, and the sense line RX5 has been touched based on the fact that the amplitude of the received sense signal is equal to or greater than the detection threshold value.

As described above, according to the touch input device 100 of the present embodiment, the signal processor 1 performs touch detection processing for a bundle of m drive lines included in one block as a target for touch detection (that is, performs touch detection processing in units of blocks) to specify a touch-related block in the first detection step. Then, the signal processor 1 performs the same touch detection processing as in the first embodiment on the m drive lines included in the touch-related block in the second detection step. Thereby, the number of time periods (the number of times of scanning) required until the touched intersection region is specified can be reduced and response characteristics can be improved. In the examples of FIGS. 8 to 12, scanning is performed three times in the first detection step, and scanning is performed three times in the second detection step, thereby specifying a touched intersection region (the total number of times of scanning is six). Compared with a case where nine drive lines are all scanned, the number of times of scanning can be reduced to ⅔.

As the number of drive lines increases, the number of times of scanning is remarkably reduced. For example, when the number of drive lines is 100, and when the number of blocks is set to 10 and the number of drive lines included in each block is set to 10, the total number of times of scanning is 20, and the number of times of scanning can be reduced to ⅕.

In the first detection step, a first drive signal having an opposite phase is output to a plurality of drive lines, and thus a voltage of the first drive signal can be lowered.

SUPPLEMENT

A touch input device according to a first aspect of the disclosure including:
M (M is an integer of 3 or greater) drive lines provided in parallel with each other along a detection surface;
N (N is an integer of 2 or greater) sense lines provided in parallel with each other along the detection surface and intersecting the M drive lines;
(M×N) electrostatic capacitances formed between the M drive lines and the N sense lines; and
a signal processor configured to output a first drive signal to at least one first drive line of the M drive lines and detect a change in a plurality of electrostatic capacitances of the (M×N) electrostatic capacitances between the at least one first drive line and the N sense lines based on sense signals received from the respective N sense lines, the signal processor sequentially changing the first drive line to detect a change in the (M×N) electrostatic capacitances,
wherein the signal processor outputs the first drive signal to the at least one first drive line and outputs a second drive signal having a phase opposite to a phase of the first drive signal to each of at least two second drive lines other than the first drive line among the M drive lines, and
the signal processor outputs the first drive signal and the second drive signal so that a first amplitude total, which is obtained by multiplying an amplitude of the first drive signal by the number of first drive lines, is substantially equal to a second amplitude total, which is obtained by multiplying an amplitude of the second drive signal by the number of second drive lines.

According to a second aspect of the disclosure, in the touch input device according to the first aspect, the at least one first drive line is a single first drive line, and
the signal processor outputs the first drive signal and the second drive signal so that the amplitude of the first drive signal is substantially equal to the second amplitude total.

According to a third aspect of the disclosure, in the touch input device according to the first or second aspect, when there is no change in any of M electrostatic capacitances of the (M×N) electrostatic capacitances between one sense line of the N sense lines and the M drive lines, an amplitude of the sense signal received from the one sense line is approximately zero.

According to a fourth aspect of the disclosure, in the touch input device according to any one of the first to third aspects, when there is a change in one electrostatic capacitance of the M electrostatic capacitances between one sense line of the N sense lines and the M drive lines, the sense signal received from the one sense line has an amplitude equal to or greater than a predetermined threshold value while the first drive signal is output to one drive line of the M drive lines which forms the one electrostatic capacitance of the M electrostatic capacitances.

According to a fifth aspect of the disclosure, in the touch input device according to the fourth aspect, when there is a change in the one electrostatic capacitance of the M electrostatic capacitances, the sense signal received from the one sense line has an amplitude that does not exceed the predetermined threshold value while the second drive signal is output to the one drive line among the M drive lines.

According to a sixth aspect of the disclosure, in the touch input device according to the fourth or fifth aspect, when there is a change in the one electrostatic capacitance of the M electrostatic capacitances, the amplitude of the sense signal received from the one sense line is approximately zero while neither the first drive signal nor the second drive signal is output to the one drive line among the M drive lines and the first drive signal is output to any one drive line among the M drive lines.

According to a seventh aspect of the disclosure, in the touch input device according to any one of the second to sixth aspects, the at least two second drive lines are (M−1) second drive lines.

According to an eighth aspect of the disclosure, in the touch input device according to any one of the second to seventh aspects, the M drive lines are divided into a plurality of blocks, and
each of the plurality of blocks includes three or more drive lines among the M drive lines, and
when the signal processor outputs the first drive signal to one drive line included in one block among the plurality of blocks as the first drive line, the signal processor outputs the second drive signal to each of at least two drive lines other than the one drive line included in the one block as the second drive line, and outputs neither the first drive signal nor the second drive signal to drive lines included in a block other than the one block among the plurality of blocks.

According to a ninth aspect of the disclosure, in the touch input device according to the first aspect, the M drive lines are divided into a plurality of blocks, and
each of the plurality of blocks includes three or more drive lines among the M drive lines,
the signal processor performs first processing of outputting the first drive signal to each of a plurality of drive lines included in one target block among the plurality of blocks as the first drive line, and outputting the second drive signal to each of a plurality of drive lines included in at least two blocks other than the target block among the plurality of blocks as the second drive line to detect a change in an electrostatic capacitance related to the target block based on sense signals received from the respective N sense lines while sequentially changing the target block, and
when the signal processor detects that there is a change in the electrostatic capacitance related to the target block, the signal processor performs second processing of outputting the first drive signal to one target drive line included in the target block as the first drive line, and outputting the second drive signal to each of at least two drive lines other than the target drive line included in the target block as the second drive line to detect a change in N electrostatic capacitances between the target drive line and the N sense lines based on the sense signals received from the respective N sense lines while sequentially changing the target drive line.

According to a tenth aspect of the disclosure, in the touch input device according to the ninth aspect, when the signal processor detects that there is a change in electrostatic capacitance related to the target block, and when the plurality of drive lines included in the target block are further divided into a plurality of sub-blocks, the signal processor performs the first processing by sequentially changing the target block using the plurality of sub-blocks as the plurality of blocks.

According to an eleventh aspect of the disclosure, in the touch input device according to the ninth or tenth aspect, the signal processor detects that there is a change in the electrostatic capacitance related to the target block when there is a change in any of the plurality of electrostatic capacitances between the plurality of drive lines included in the target block and the N sense lines.

According to a twelfth aspect of the disclosure, in the touch input device according to any one of the ninth to eleventh aspects, when there is no change in any of the M electrostatic capacitances between one sense line of the N sense lines and the M drive lines, an amplitude of the sense signal received from the one sense line is approximately zero.

According to a thirteenth aspect of the disclosure, in the touch input device according to any one of the ninth to twelfth aspects, when there is a change in one electrostatic capacitance of the M electrostatic capacitances between one sense line of the N sense lines and the M drive lines, the sense signal received from the one sense line has an amplitude equal to or greater than a predetermined threshold value while the first drive signal is output to each of a plurality of drive lines included in a block of the plurality of blocks, the block including one drive line of the M drive lines which forms the one electrostatic capacitance of the M electrostatic capacitances.

According to a fourteenth aspect of the disclosure, in the touch input device according to the thirteenth aspect, when there is a change in the one electrostatic capacitance of the M electrostatic capacitances, the sense signal received from the one sense line has an amplitude that does not exceed the predetermined threshold value while the second drive signal is output to each of the plurality of drive lines included in the block including the one drive line.

According to a fifteenth aspect of the disclosure, in the touch input device according to the thirteenth or fourteenth aspect, when there is a change in the one electrostatic capacitance of the M electrostatic capacitances, the amplitude of the sense signal received from the one sense line is approximately zero while neither the first drive signal nor the second drive signal is output to the plurality of drive lines included in the block including the one drive line and the first drive signal is output to any one of the M drive lines.

A display device according to a sixteenth aspect of the disclosure includes the touch input device according to any one of the first to fifteenth aspects.

The embodiments and examples described above are for the purpose of illustration and description and are not intended to be limiting. It will be apparent to those skilled in the art that many variations will be possible in accordance with these examples and descriptions.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A touch input device comprising:
M (M is an integer of 3 or greater) drive lines provided in parallel with each other along a detection surface;
N (N is an integer of 2 or greater) sense lines provided in parallel with each other along the detection surface and intersecting the M drive lines;
(M×N) electrostatic capacitances formed between the M drive lines and the N sense lines; and
a signal processor configured to output a first drive signal to at least one first drive line of the M drive lines and detect a change in a plurality of electrostatic capacitances of the (M×N) electrostatic capacitances between the at least one first drive line and the N sense lines based on sense signals received from the respective N sense lines, the signal processor sequentially changing the first drive line to detect a change in the (M×N) electrostatic capacitances,
wherein the signal processor outputs the first drive signal to the at least one first drive line and outputs a second drive signal having a phase opposite to a phase of the first drive signal to each of at least two second drive lines other than the first drive line among the M drive lines, and
the signal processor outputs the first drive signal and the second drive signal so that a first amplitude total, which is obtained by multiplying an amplitude of the first drive signal by the number of first drive lines, is substantially equal to a second amplitude total, which is obtained by multiplying an amplitude of the second drive signal by the number of second drive lines.

2. The touch input device according to claim 1,
wherein the at least one first drive line is a single first drive line, and
the signal processor outputs the first drive signal and the second drive signal so that the amplitude of the first drive signal is substantially equal to the second amplitude total.

3. The touch input device according to claim 2,
wherein, when there is no change in any of M electrostatic capacitances of the (M×N) electrostatic capacitances between one sense line of the N sense lines and the M drive lines, an amplitude of the sense signal received from the one sense line is approximately zero.

4. The touch input device according to claim 2,
wherein, when there is a change in one electrostatic capacitance of the M electrostatic capacitances between one sense line of the N sense lines and the M drive lines, the sense signal received from the one sense line has an amplitude equal to or greater than a predetermined threshold value while the first drive signal is output to one drive line of the M drive lines which forms the one electrostatic capacitance of the M electrostatic capacitances.

5. The touch input device according to claim 4,
wherein, when there is a change in the one electrostatic capacitance of the M electrostatic capacitances, the sense signal received from the one sense line has an amplitude that does not exceed the predetermined threshold value while the second drive signal is output to the one drive line among the M drive lines.

6. The touch input device according to claim 4,
wherein, when there is a change in the one electrostatic capacitance of the M electrostatic capacitances, the amplitude of the sense signal received from the one sense line is approximately zero while neither the first drive signal nor the second drive signal is output to the one drive line among the M drive lines and the first drive signal is output to any one drive line among the M drive lines.

7. The touch input device according to claim 2,
wherein the at least two second drive lines are (M−1) second drive lines.

8. The touch input device according to claim 2,
wherein the M drive lines are divided into a plurality of blocks, and
each of the plurality of blocks includes three or more drive lines among the M drive lines, and
when the signal processor outputs the first drive signal to one drive line included in one block among the plurality of blocks as the first drive line, the signal processor outputs the second drive signal to each of at least two drive lines other than the one drive line included in the one block as the second drive line, and outputs neither the first drive signal nor the second drive signal to drive lines included in a block other than the one block among the plurality of blocks.

9. The touch input device according to claim 1,
wherein the M drive lines are divided into a plurality of blocks, and
each of the plurality of blocks includes three or more drive lines among the M drive lines,
the signal processor performs first processing of outputting the first drive signal to each of a plurality of drive lines included in one target block among the plurality of blocks as the first drive line, and outputting the second drive signal to each of a plurality of drive lines included in at least two blocks other than the target block among the plurality of blocks as the second drive line to detect a change in an electrostatic capacitance related to the target block based on sense signals received from the respective N sense lines while sequentially changing the target block, and
when the signal processor detects that there is a change in the electrostatic capacitance related to the target block, the signal processor performs second processing of outputting the first drive signal to one target drive line included in the target block as the first drive line, and outputting the second drive signal to each of at least two drive lines other than the target drive line included in the target block as the second drive line to detect a change in N electrostatic capacitances between the target drive line and the N sense lines based on the sense signals received from the respective N sense lines while sequentially changing the target drive line.

10. The touch input device according to claim 9,
wherein, when the signal processor detects that there is a change in the electrostatic capacitance related to the target block, and when the plurality of drive lines included in the target block are further divided into a plurality of sub-blocks, the signal processor performs the first processing by sequentially changing the target block using the plurality of sub-blocks as the plurality of blocks.

11. The touch input device according to claim 9,
wherein the signal processor detects that there is a change in the electrostatic capacitance related to the target block when there is a change in any of a plurality of electrostatic capacitances between the plurality of drive lines included in the target block and the N sense lines.

12. The touch input device according to claim 9,
wherein, when there is no change in any of the M electrostatic capacitances between one sense line of the N sense lines and the M drive lines, an amplitude of the sense signal received from the one sense line is approximately zero.

13. The touch input device according to claim 9,
wherein, when there is a change in one electrostatic capacitance of the M electrostatic capacitances between one sense line of the N sense lines and the M drive lines, the sense signal received from the one sense line has an amplitude equal to or greater than a predetermined threshold value while the first drive signal is output to each of a plurality of drive lines included in a block of the plurality of blocks, the block including one drive line of the M drive lines which forms the one electrostatic capacitance of the M electrostatic capacitances.

14. The touch input device according to claim 13,
wherein, when there is a change in the one electrostatic capacitance of the M electrostatic capacitances, the sense signal received from the one sense line has an amplitude that does not exceed the predetermined threshold value while the second drive signal is output to each of the plurality of drive lines included in the block including the one drive line.

15. The touch input device according to claim 13,
wherein, when there is a change in the one electrostatic capacitance of the M electrostatic capacitances, the amplitude of the sense signal received from the one sense line is approximately zero while neither the first drive signal nor the second drive signal is output to the plurality of drive lines included in the block including the one drive line and the first drive signal is output to any one of the M drive lines.

16. A display device comprising:
the touch input device according to claim 1.

* * * * *